United States Patent
Fujikata et al.

(10) Patent No.: US 11,054,675 B2
(45) Date of Patent: Jul. 6, 2021

(54) OPTICAL MODULATOR AND METHOD FOR MANUFACTURING THE SAME

(71) Applicants: PHOTONICS ELECTRONICS TECHNOLOGY RESEARCH ASSOCIATION, Tokyo (JP); THE UNIVERSITY OF TOKYO, Tokyo (JP)

(72) Inventors: Junichi Fujikata, Tokyo (JP); Shigeki Takahashi, Tokyo (JP); Mitsuru Takenaka, Tokyo (JP)

(73) Assignees: PHOTONICS ELECTRONICS TECHNOLOGY RESEARCH ASSOCIATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 16/645,377

(22) PCT Filed: Aug. 24, 2018

(86) PCT No.: PCT/JP2018/031260
§ 371 (c)(1),
(2) Date: Mar. 6, 2020

(87) PCT Pub. No.: WO2019/049681
PCT Pub. Date: Mar. 14, 2019

(65) Prior Publication Data
US 2020/0301177 A1    Sep. 24, 2020

(30) Foreign Application Priority Data
Sep. 8, 2017  (JP) .............................. JP2017-173090

(51) Int. Cl.
*G02F 1/025* (2006.01)
*G02F 1/015* (2006.01)
*G02B 6/12* (2006.01)

(52) U.S. Cl.
CPC .............. *G02F 1/025* (2013.01); *G02F 1/015* (2013.01); *G02B 2006/12142* (2013.01);
(Continued)

(58) Field of Classification Search
CPC ...... G02F 1/015; G02F 1/025; G02F 1/01708; G02F 2001/0151–0158; G02F 2201/063; G02F 2203/50
(Continued)

(56) References Cited

U.S. PATENT DOCUMENTS

| 7,672,553 B2 * | 3/2010 | Gill | .......................... G02F 1/025 385/40 |
| 8,737,772 B2 * | 5/2014 | Dong | ...................... G02F 1/025 385/2 |

(Continued)

FOREIGN PATENT DOCUMENTS

| JP | 2013-109170 A | 6/2013 |
| JP | 2013-214044 A | 10/2013 |

(Continued)

OTHER PUBLICATIONS

"High speed carrier-depletion modulators with 1.4 V*cm VL integrated on 0.25 m silicon-on-insulator waveguides" by Feng et al, Optics Express, vol. 18, No. 8, pp. 7994-7999, 2010.*
(Continued)

*Primary Examiner* — Robert Tavlykaev
(74) *Attorney, Agent, or Firm* — Michael Best & Friedrich LLP

(57) ABSTRACT

Provided is an optical modulator which is small in optical loss, is small in a size, and is low in required voltage and is
(Continued)

operable to perform high-speed operation. The optical phase modulator 100 comprises a rib-type waveguide structure 110 including: a PN junction 106 which is formed of Si and is formed in a lateral direction on a substrate; and an $Si_{1-x}Ge_x$ layer 108 which is constituted of at least one layer and is doped with an impurity to a p-type and is superposed on the PN junction 106 so as to be electrically connected to the PN junction 106. The rib-type waveguide structure 110 has a substantially uniform structure along a light propagation direction, and in a direction parallel with the substrate and perpendicular to the light propagation direction, a position of a junction interface 106a of the PN junction 106 is offset from a center of the $Si_{1-x}Ge_x$ layer 108.

15 Claims, 19 Drawing Sheets

(52) U.S. Cl.
CPC ...... *G02F 1/0152* (2021.01); *G02F 2201/063* (2013.01); *G02F 2203/50* (2013.01)

(58) Field of Classification Search
USPC .......................................................... 385/1–3
See application file for complete search history.

(56) References Cited

U.S. PATENT DOCUMENTS

| | | | |
|---|---|---|---|
| 2010/0060970 A1* | 3/2010 | Chen ................. | G02F 1/025 359/245 |
| 2010/0080504 A1* | 4/2010 | Shetrit ............... | G02F 1/2257 385/14 |
| 2011/0206313 A1* | 8/2011 | Dong ................. | G02F 1/025 385/2 |
| 2012/0033910 A1* | 2/2012 | Morini ............... | G02F 1/025 385/3 |
| 2012/0189239 A1 | 7/2012 | Tu et al. | |
| 2013/0126941 A1 | 5/2013 | Zhu et al. | |
| 2014/0233878 A1 | 8/2014 | Goi et al. | |
| 2014/0355925 A1* | 12/2014 | Manouvrier ......... | H04B 10/548 385/3 |
| 2018/0024410 A1 | 1/2018 | Fujikata et al. | |

FOREIGN PATENT DOCUMENTS

WO  WO-2013/062096 A1  5/2013
WO  WO-2016/125772 A1  8/2016

OTHER PUBLICATIONS

"Silicon Microring Modulator for Dispersion Uncompensated Transmission Applications" by Wang et al, Journal of Lightwave Technology, vol. 34, No. 16, pp. 3675-3680 (Year: 2016).*
"High contrast 40Gbit/s optical modulation in silicon" by Thomson et al, Optics Express, vol. 19, No. 12, 11507-11516 (Year: 2011).*
"Modeling and optimization of a single-drive push-pull silicon Mach-Zehnder modulator" by Zhou et al, Photonics Research, vol. 4, No. 4, pp. 153-161 (Year: 2016).*
William M.J. Green et al., "Ultra-compact, low RF power, 10 Gb/s silicon Mach-Zehnder modulator" Optical Express, Dec. 10, 2007 (Received Sep. 21, 2007), pp. 17106-17113, vol. 15, Issue 25, DOI: 10.1364/OE.15.017106, The Optical Society.
International Search Report issued in Application No. PCT/JP2018/031260, dated Nov. 13, 2018.

* cited by examiner

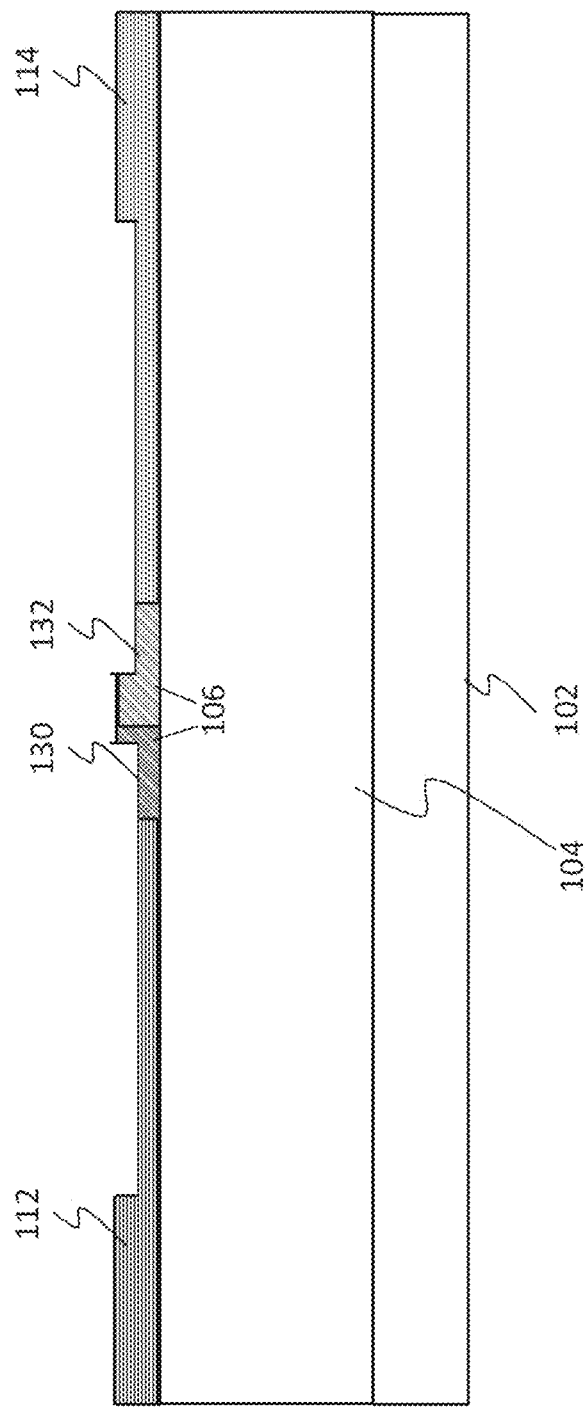

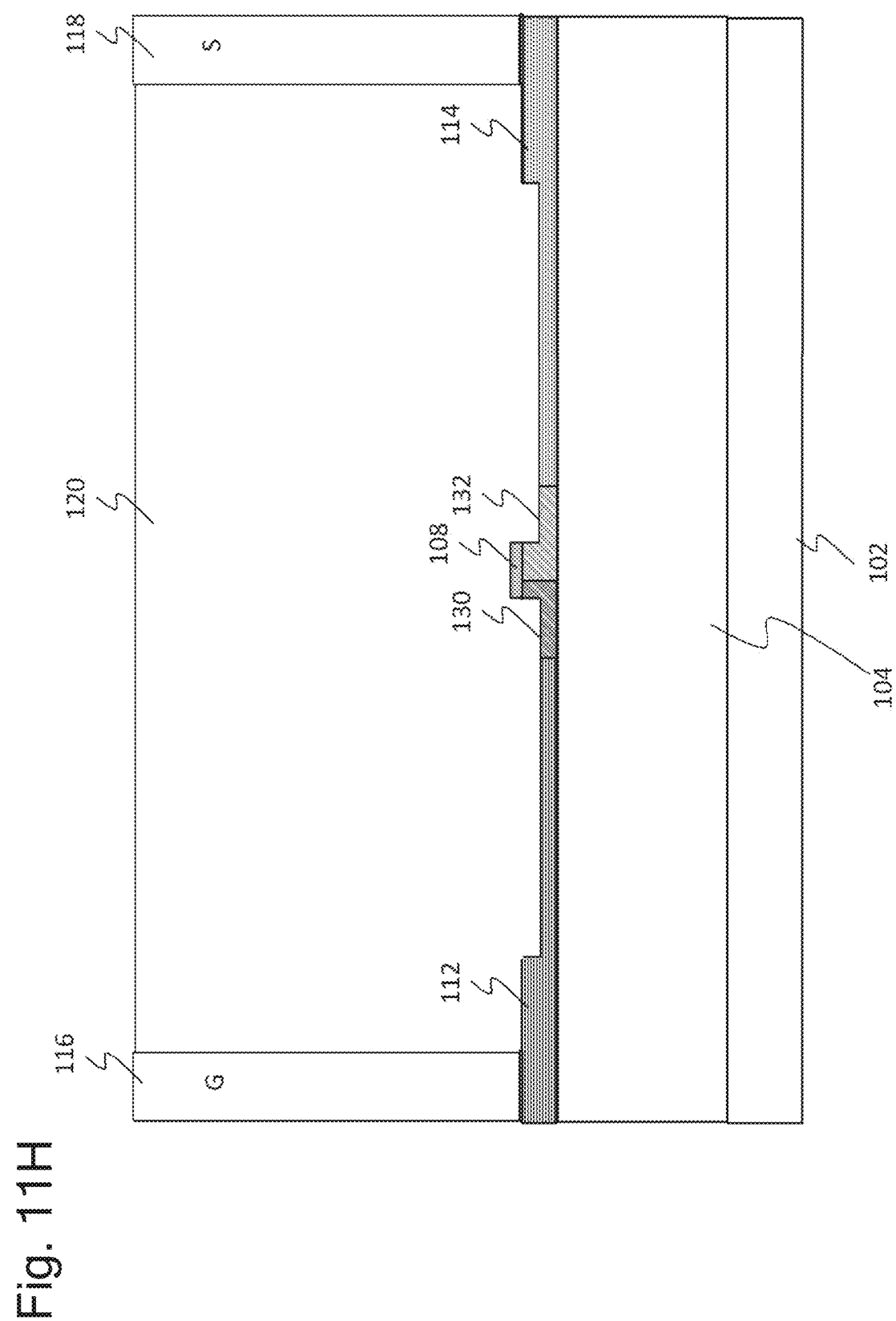

OPTICAL MODULATOR AND METHOD FOR MANUFACTURING THE SAME

TECHNICAL FIELD

The present invention relates to an optical modulator and a method for manufacturing an optical modulator and, more particularly, to an optical phase modulator and an optical intensity modulator, which utilize a carrier plasma effect of silicon (Si), a method for manufacturing an optical phase modulator, and a method for manufacturing an optical intensity modulator.

BACKGROUND ART

Silicon-based optical communication devices which function at optical fiber wavelengths of 1310 nm and 1550 nm for various systems such as home use optical fiber and local area networks (LANs) allow optical function elements and electronic circuits to be integrated on silicon platforms by utilizing CMOS technology and are greatly promising technology.

In recent years, passive devices such as silicon-based waveguides, optical couplers, and wavelength filters have been very extensively studied. In addition, as important technology as means for manipulating optical signals for such communication systems, active elements such as silicon-based optical modulators and optical switches are cited and have been attracting much attention. The optical switches and modulation elements which change refractive indices by utilizing thermo-optic effect of silicon are low in speed and are applicable only to devices whose device speed is up to a modulation frequency of 1 Mb/second. Accordingly, in order to realize a high modulation frequency which is required of more optical communication systems, optical modulation elements utilizing electro-optic effect are required.

Many of the presently proposed electro-optic modulators are devices, each of which utilizes the carrier plasma effect to change a free carrier density in a silicon layer, thereby changing a real part and an imaginary part of a refractive index to change a phase and an intensity of light. The above-mentioned effect has been widely utilized, since pure silicon does not exhibit linear electro-optic effect (Pockels) effect and a change in refractive index obtained by the Franz-Keldysh effect or the Kerr effect is very small. In a modulator which utilizes free carrier absorption, output is directly modulated by a change in absorption of light propagating in Si. As a structure utilizing the change in the refractive index, a structure utilizing the Mach-Zehnder interferometer is generally used, and an optical intensity modulating signal can be obtained by causing interference relating to an optical phase difference between two arms.

A free carrier density in the electro-optic modulator can be changed by injection, accumulation, removal, or inversion of free carriers. Many of the above-mentioned apparatuses so far examined are inferior in optical modulation efficiency, and a length required for optical phase modulation in each of such apparatuses is on the order of mm, and an injection current density higher than 1 kA/cm$^3$ is required. In order to realize downsizing, high integration, and further, low power consumption, an element structure capable of obtaining a high optical modulation efficiency is required, and this allows an optical phase modulation length to be made small. In addition, when an element size is large, such an element is susceptible to temperature distribution on a silicon platform, and it is also assumed that the original electro-optic effect is cancelled by a change in refractive index of a silicon layer, which is attributable to the thermo-optic effect, thereby leading to a problem.

FIG. 12 shows a typical example of a silicon-based electro-optic phase modulator utilizing a rib waveguide shape formed on an SOI substrate, disclosed in NPL 1 and PTL 1. In the electro-optic phase modulator, slab regions which extend in a lateral direction on both sides of a rib shape constituted of an intrinsic semiconductor region are p-doped and n-doped to be formed. The above-mentioned rib waveguide structure is formed by utilizing an Si layer on a silicon-on-insulator (SOI) substrate. The structure shown in FIG. 12 is a structure of a PIN diode type modulator in which a forward bias and a reverse bias are applied, thereby changing a free carrier density inside the intrinsic semiconductor region and the carrier plasma effect is utilized, thereby changing a refractive index. In this example, the intrinsic semiconductor silicon layer 2501 is formed to include a p-type region 2504, which is doped at a high concentration, in a region contacting a first electrode contact layer 2506. In FIG. 12, the intrinsic semiconductor silicon layer 2501 further includes a region 2505 which is n-type doped at a high concentration and a second electrode contact layer 2506 which is connected to the region 2505. In the above-mentioned PIN diode structure, it is also possible to dope the regions 2504 and 2505 so as to each exhibit a carrier density of approximately 10$^{20}$ per cm$^3$. In addition, in the above-mentioned PIN structure, the p-type region 2504 and the n-type region 2505 are arranged in such a way as to be spaced apart from each other on the both sides of the rib 2501, and the rib 2501 is an intrinsic semiconductor layer. In addition, in FIG. 12, a support substrate 2503, a buried oxide film layer 2502, electrode wires 2507, and an oxide clad 2508 are shown.

As to optical modulation operation, the first and second electrode contact layers 2506 are connected to a power source to apply the forward bias to the PIN diode, thereby injecting free carriers into the waveguide. At this time, an increase in the free carriers causes a change in the refractive index of the silicon layer 2501, thereby resulting in phase modulation of light transmitted through the waveguide. However, a speed of this optical modulation operation is limited by a lifetime of the free carriers inside the rib 2501 and by carrier diffusion in the case of the forward bias being applied. The PIN diode phase modulator of the conventional technology as described above, in general, has an operation speed in a range of 10 Mb/second to 50 Mb/second during the forward bias operation. On the other hand, although in order to shorten the lifetime of the carriers, it is possible to increase a switching speed by introducing an impurity into the silicon layer, there arises a problem in that the introduced impurity reduces an optical modulation efficiency. In addition, the largest factor which adversely affects the operation speed is due to an RC time constant, and in this case, an electrical capacitance (C) upon applying the forward bias becomes extremely large due to a carrier diffusion capacitance of a PN junction. On the other hand, although it is possible to achieve high-speed operation of the PN junction by applying a reverse bias, a comparatively large driving voltage or a large element size is required.

CITATION LIST

Patent Literature

PTL 1: Japanese Patent Application Laid-Open No. 2013-214044
PTL 2: International Publication No. WO2016/125772

Non Patent Literature

NPL 1: William M. J. Green, Michael J. Rooks, Lidija Sekaric, and Yurii A. Vlasof, Opt. Express 15, 17106-171113 (2007), "Ultra-compact, low RF power, 10 Gb/s silicon Mach-Zehnder modulator."

SUMMARY OF INVENTION

Technical Problem

Accordingly, an optical modulator which is small in optical loss, is small in size, is low in required voltage and is operable to perform high-speed operation is required.

Solution to Problem

In an embodiment of a the present invention, an optical phase modulator includes: a rib-type waveguide structure, the rib-type waveguide structure including: a PN junction or a PIN junction which is formed of Si or $Si_{1-y}Ge_y$ and is formed in a lateral direction on a substrate; and an $Si_{1-x}Ge_x$ layer which is constituted of at least one layer and is doped with an impurity so as to exhibit a first conductive type or a second conductive type, the $Si_{1-x}Ge_x$ layer being superposed on the PN junction or the PIN junction so as to be electrically connected to the PN junction or the PIN junction, the rib-type waveguide structure has a substantially uniform structure along a light propagation direction, and in a direction parallel with the substrate and perpendicular to the light propagation direction, a position of a junction interface of the PN junction or the PIN junction is offset from a center of the $Si_{1-x}Ge_x$ layer.

In the embodiment of the present invention, the position of the junction interface of the PN junction or the PIN junction is offset to a direction of a p-type region or an n-type region which constitutes the PN junction or the PIN junction so as to increase an electrical capacitance of the PN junction or the PIN junction.

In the embodiment of the present invention, the optical phase modulator includes: a first electrode of the first conductive type; and a second electrode of the second conductive type which neighbor the rib-type waveguide structure, and by applying a voltage to each of the first electrode and the second electrode, a carrier density in the rib-type waveguide structure is changed.

In the embodiment of the present invention, the $Si_{1-x}Ge_x$ layer being constituted of the at least one layer has lattice strain.

In the embodiment of the present invention, the PN junction or the PIN junction being formed in the lateral direction on the substrate is constituted of a layered structure of a PN junction or a PIN junction which is formed of Si and a PN junction or a PIN junction which is formed of $Si_{1-y}Ge_y$.

In the embodiment of the present invention, the PN junction or the PIN junction being formed in the lateral direction on the substrate and being constituted of the layered structure of Si and $Si_{1-y}Ge_y$ includes a rib-type waveguide structure.

In the embodiment of the present invention, the $Si_{1-x}Ge_x$ layer being constituted of the at least one layer includes: an $Si_{1-x1}Ge_{x1}$ layer being superposed on the PN junction or the PIN junction; and an $Si_{1-x2}Ge_{x2}$ layer being superposed on the $Si_{1-x1}Ge_{x1}$ layer, and x2 is smaller than x1.

In the embodiment of the present invention, the $Si_{1-x}Ge_x$ layer being constituted of the at least one layer includes a strain induction film being formed above the $Si_{1-x}Ge_x$ layer or on a side surface thereof.

In the embodiment of the present invention, in the PN junction or the PIN junction being formed in the lateral direction on the substrate or in the $Si_{1-x}Ge_x$ layer being constituted of the at least one layer and being superposed on the PN junction or the PIN junction so as to be electrically connected to the PN junction or the PIN junction, a doping concentration of the first conductive type is smaller than a doping concentration of the second conductive type.

In the embodiment of the present invention, the first conductive type is a p-type and the second conductive type is an n-type.

In the embodiment of the present invention, the PN junction is constituted of a single PN junction which is formed of a single p-type region and a single n-type region which extend in the light propagation direction.

In an embodiment of the present invention, an optical intensity modulator includes the optical phase modulator described above.

In an embodiment of the present invention, a method for manufacturing an optical phase modulator includes: a step of forming a PN junction or a PIN junction which is formed of Si or $Si_{1-y}Ge_y$ and is formed in a lateral direction; a step of first conductive type-doping and second conductive type-doping regions which respectively neighbor the PN junction or the PIN junction and of forming a first electrode of a first conductive type and a second electrode of a second conductive type; and a step of, on the PN junction or the PIN junction, forming an $Si_{1-x}Ge_x$ layer which is constituted of at least one layer and is electrically connected to the PN junction or the PIN junction, the $Si_{1-x}Ge_x$ layer being doped with an impurity so as to exhibit the first conductive type or the second conductive type, by the PN junction or PIN junction and the $Si_{1-x}Ge_x$ layer, a rib-type waveguide structure having a substantially uniform structure along a light propagation direction is formed, and in a direction parallel with a substrate and perpendicular to the light propagation direction, a position of a junction interface of the PN junction or the PIN junction is offset from a center of the $Si_{1-x}Ge_x$ layer.

Advantageous Effects of Invention

According to the present invention, an optical phase modulator which is small in optical loss, is small in size, is low in required voltage and is operable to perform high-speed operation can be realized.

BRIEF DESCRIPTION OF DRAWINGS

FIG. 11D is a diagram explaining a process of manufacturing the optical phase modulator according to the embodiment of the present invention illustrated in FIG. 1.

FIG. 11H is a diagram explaining a process of manufacturing the optical phase modulator according to the embodiment of the present invention illustrated in FIG. 1.

DESCRIPTION OF EMBODIMENTS

Figure 1:
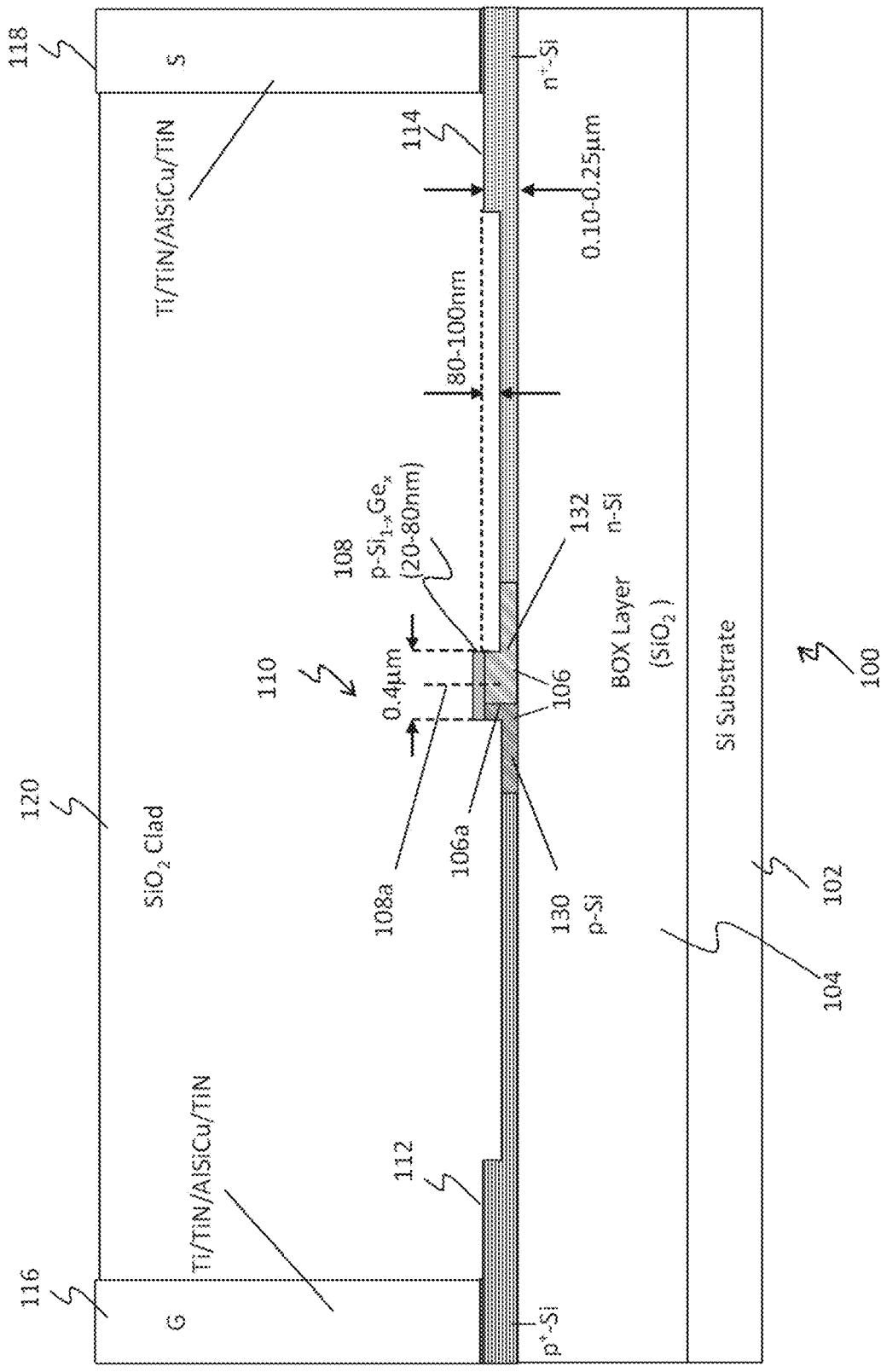
FIG. 1 is a cross-sectional view schematically illustrating an optical phase modulator 100 according to one embodiment of the present invention.

Hereinafter, embodiments of the present invention will be explained in detail with reference to the accompanying drawings. FIG. 1 is a cross-sectional view schematically illustrating an optical phase modulator 100 according to one embodiment of the present invention. In the present embodiment, the optical phase modulator 100 is formed on a buried oxide film (BOX) layer 104 formed of silica glass ($SiO_2$) deposited on a silicon (Si) substrate 102 by employing the silicon photonics technology. The optical phase modulator 100 includes a rib-type waveguide structure 110. The rib-type waveguide structure 110 includes a PN junction 106 which is formed in a lateral direction with respect to the substrate (a horizontal direction with respect to the substrate) and is formed of Si. The PN junction 106 includes a p-type Si region 130 and an n-type Si region 132. As described later, the PN junction 106 may be formed of $Si_{1-y}Ge_y$ (where y is equal to or greater than 0 and equal to or less than 1). The rib-type waveguide structure 110 may include a PIN junction, instead of the PN junction 106. The PIN junction mentioned above may include both a PIN junction intentionally formed and a PIN junction modified from a PN junction and thereby unintentionally formed. The case in which the PIN is unintentionally formed is a case in which in the PN junction 106, electrons and positive holes are recombined with each other due to thermal diffusion and become an I layer. The rib-type waveguide structure 110 also includes an $Si_{1-x}Ge_x$ (where x is equal to or greater than 0 and equal to or less than 1) layer 108 which has conductivity obtained by impurity doping and is constituted of at least one layer superposed on the PN junction 106. In the present embodiment, although a conductive type of the $Si_{1-x}Ge_x$ layer 108 is a p-type, the conductive type of the $Si_{1-x}Ge_x$ layer 108 may be an n-type. As described above, the $Si_{1-x}Ge_x$ layer 108 has the conductivity and accordingly, is electrically connected to the PN junction 106.

As shown in FIG. 1, as one example, a width of the $Si_{1-x}Ge_x$ layer 108 is 0.4 μm and a thickness of the $Si_{1-x}Ge_x$ layer 108 is 20 nm to 80 nm. In addition, as one example, a height of the PN junction in the rib-type waveguide structure 110 is 80 nm to 100 nm with respect to a slab layer as shown in FIG. 1. In addition, as one example, a thickness of each of electrodes 112 and 114 is 0.10 μm to 0.18 μm.

A junction interface 106a of the PN junction 106 is disposed in a position different from a position where a center 108a of the $Si_{1-x}Ge_x$ layer 108 superposed on the PN junction 106 is located. In other words, the position where the junction interface 106a of the PN junction 106 is located is offset from the center 108a of the $Si_{1-x}Ge_x$ layer 108. An offset direction is parallel with the substrate 102 and is in a direction perpendicular to a longitudinal direction (that is, a light propagation direction) of the rib-type waveguide structure 110. In an example shown in FIG. 1, the position of the junction interface 106a of the PN junction 106 is offset from the center 108a of the p-type $Si_{1-x}Ge_x$ layer 108 in a direction toward the p-type Si region 130 (hereinafter, referred to as a minus direction). Therefore, in a portion of the rib-type waveguide structure 110, a contact area where the p-type $Si_{1-x}Ge_x$ layer 108 contacts the n-type Si region 132 is larger than a contact area where the p-type $Si_{1-x}Ge_x$ layer 108 contacts the p-type Si region 130. In other words, in the optical phase modulator 100 according to the present embodiment, as compared with a structure in which the junction interface 106a of the PN junction 106 is disposed in such a way as to coincide with the center 108a of the $Si_{1-x}Ge_x$ layer 108, the contact area where the p-type $Si_{1-x}Ge_x$ layer 108 contacts the n-type Si region 132 is enlarged.

The optical phase modulator 100 also includes a first electrode 112 of a first conductive type (for example, p-type) and a second electrode 114 of a second conductive type (for example, n-type), which neighbor the rib-type waveguide structure 110, a grounding electrode 116, a signal electrode 118, and a clad 120. Each of the grounding electrode 116 and the signal electrode 118 may be formed of, for example, Ti, TiN, AlSiCu, TiN, or the like. Via the grounding electrode 116 and the signal electrode 118, a voltage is applied to each of the first electrode 112 and the second electrode 114, thereby changing a carrier density in the rib-type waveguide structure 110.

Figure 2:
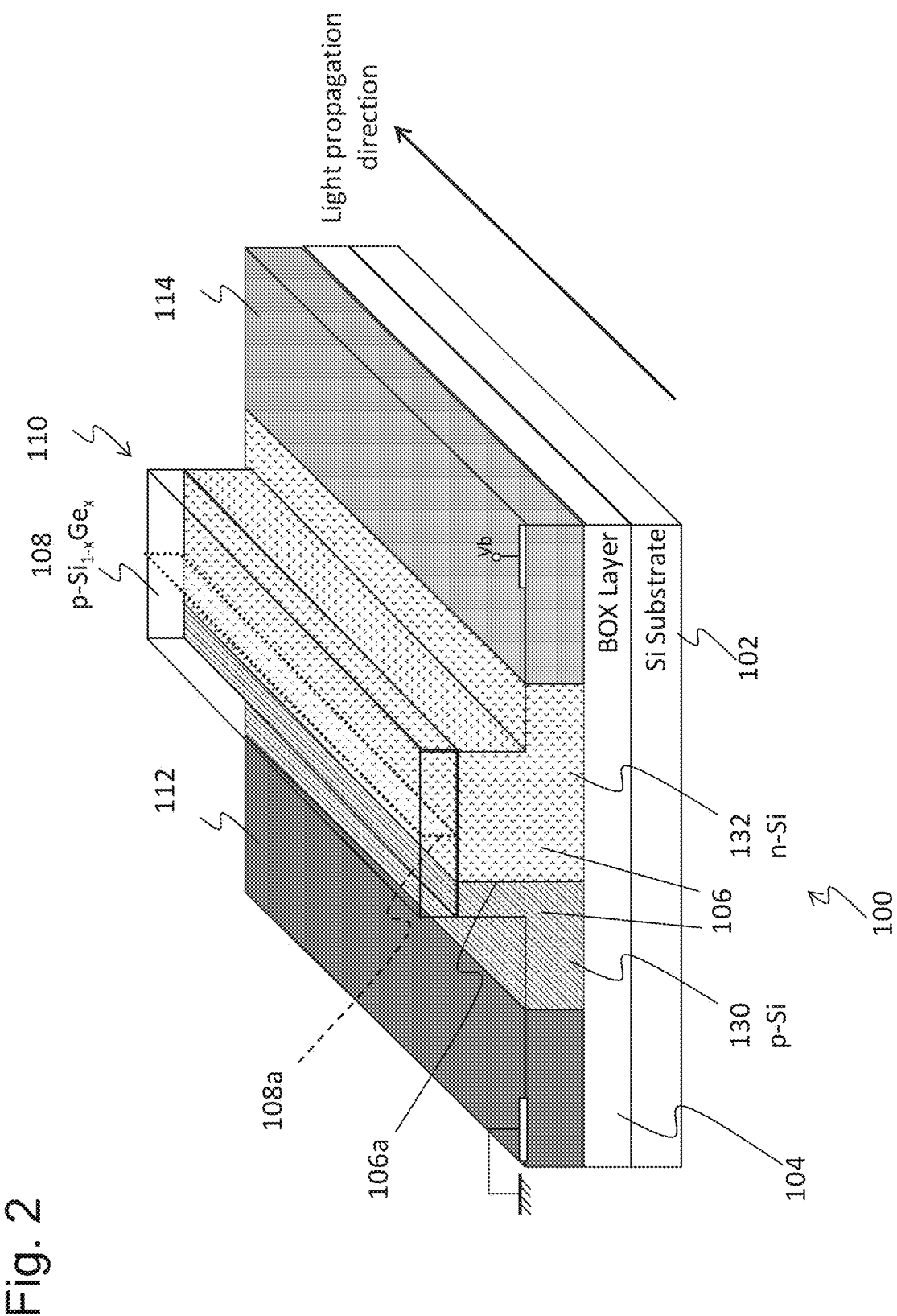
FIG. 2 is a perspective view schematically illustrating the optical phase modulator 100 illustrated in FIG. 1.

FIG. 2 is a perspective view schematically illustrating the optical phase modulator 100 illustrated in FIG. 1. As shown in FIG. 2, the rib-type waveguide structure 110 of the optical phase modulator 100 has a uniform structure along the longitudinal direction (that is, the light propagation direction). More specifically, in the rib-type waveguide structure 110, the p-type Si region 130 integrally extends along the light propagation direction as a single region, and each shape of cross sections of the p-type Si region 130 as a face which is perpendicular to the light propagation direction is invariable, regardless of any cross-sectioned positions. Similarly, the n-type Si region 132 integrally extends along the light propagation direction as a single region, and each shape of cross sections of the n-type Si region 132 as a face which is perpendicular to the light propagation direction is invariable, regardless of any cross-sectioned positions. Accordingly, the junction interface 106a of the PN junction 106 is formed in such a way as to extend over the entire length of the rib-type waveguide structure 110 along the light propagation direction as one planar surface parallel with the light propagation direction. As described above, the PN junction 106 in the rib-type waveguide structure 110 is configured by the single PN junction constituted of the single p-type Si region 130 and the single n-type Si region 132 which extend in the light propagation direction.

The optical phase modulator 100 utilizes the carrier plasma effect to phase-modulate light. A change in refractive index which is attained by plasma dispersion effect of the carrier plasma effect can be represented by the following formula.

[Formula 1]

$$\Delta n = -\frac{e^2 \lambda^2}{8\pi^2 c^2 \varepsilon_0 n} \left( \frac{\Delta N_e}{m^*_{ce}} + \frac{\Delta N_h}{m^*_{ch}} \right) \quad (1)$$

Here, $\Delta n$ denotes a change in refractive index, e denotes a unit charge, $\lambda$ denotes a light wavelength, c denotes a light speed, $\varepsilon_0$ denotes a permittivity of vacuum, n denotes a refractive index of Si, $\Delta N_e$ denotes a change in electron density, $m^*_{ce}$ denotes an effective mass of electrons, $\Delta N_h$ denotes a change in positive hole density, and $m^*_{ch}$ denotes an effective mass of positive holes. As can be understood from the formula (1), when the effective mass of the electrons or the effective mass of the positive holes is decreased, $\Delta n$ which is the change in refractive index is increased.

An amount of a change in phase $\Delta\varphi$ produced in the rib-type waveguide structure 110 of the optical phase modulator 100 can be represented as in the following formula by using the change in refractive index $\Delta n$ in the formula (1).

[Formula 2]

$$\Delta\varphi = \frac{2\pi}{\lambda} \Delta n \times L \propto \frac{2\pi}{\lambda} \times CV \quad (2)$$

Here, L denotes a length of the rib-type waveguide structure 110 along the light propagation direction, C denotes an electrical capacitance of the PN junction 106, and V denotes a voltage applied to the PN junction 106. The formula (2) indicates that the applied voltage V required to produce a certain amount of the change in phase $\Delta\varphi$ is in inverse proportion to the electrical capacitance C of the PN junction 106. In general, as an index of a modulation efficiency in the optical phase modulator, a figure of merit $V_\pi L$ is used. The term $V_\pi L$ is a product of a voltage required to shift the phase by $\pi$ in an optical phase shifter and a length. From the formula (2) and the definition of $V_\pi L$, it is understood that the figure of merit $V_\pi L$ of the optical phase modulator 100 is in inverse proportion to the electrical capacitance C of the PN junction 106 as in the following formula.

[Formula 3]

$$V_\pi L \propto \frac{1}{C} \quad (3)$$

When the $Si_{1-x}Ge_x$ layer is superposed on the Si layer, due to a difference between a lattice constant of the Si and a lattice constant of the $Si_{1-y}Ge_y$, strain (lattice strain) is induced in the $Si_{1-x}Ge_x$ layer. When the strain is induced in the $Si_{1-x}Ge_x$ layer, an effective mass of the carriers becomes small. The $Si_{1-x}Ge_x$ layer 108 is used, thereby reducing the effective mass of the free carriers. Accordingly, as can be understood from the formula (1), since the change in the refractive index, which is attained by the plasma dispersion effect, becomes large, the carrier plasma effect can be enhanced. Accordingly, since a phase shift amount required at a shorter distance can be obtained, the modulation efficiency of the optical phase modulator 100 can be ameliorated and a size of the optical phase modulator 100 can be made small, and a loss in the optical phase modulator 100 can be made small. In addition, since the effective mass of the free carriers becomes small, mobility of the free carriers, which is in the relationship of an inverse number to the effective mass, is increased. Accordingly, high-speed operation of the optical phase modulator 100 is enabled.

In addition, as described above, since in the optical phase modulator 100, the contact area where the p-type $Si_{1-x}Ge_x$ layer 108 and the n-type Si region 132 contact each other is large, as compared with a configuration in which the junction interface 106a of the PN junction 106 and the center 108a of the $Si_{1-x}Ge_x$ layer 108 are arranged in such a way as to coincide with each other, the optical phase modulator 100 has the further large electrical capacitance C. Accordingly, as is understood from the formula (3), the modulation efficiency of the optical phase modulator 100 can be further ameliorated.

In the PN junction 106 and/or the $Si_{1-x}Ge_x$ layer 108, a p-type doping concentration may be smaller than an n-type doping concentration. In the SiGe, an enhancement factor attained by the positive holes of the carrier plasma effect is approximately twice as large as that attained by the electrons. Accordingly, the doping concentration of the p-type SiGe layer is made smaller than the doping concentration of the n-type SiGe layer, thereby allowing the trade-off relationship between the refractive index difference and the absorption coefficient to be relaxed. As a result, an increase in the light absorption coefficient is inhibited and speed can be increased.

Figure 3:
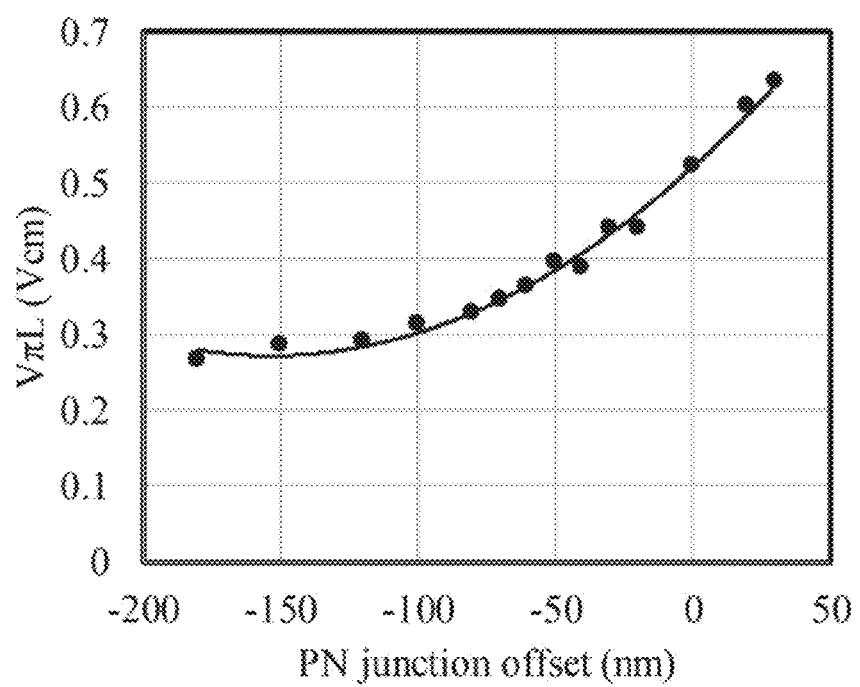
FIG. 3 shows illustrative computation results of relationship between an offset amount of a junction interface 106a of a PN junction 106 and a figure of merit $V_\pi L$.

FIG. 3 shows illustrative computation results of the relationship between the offset amount of the junction interface 106a of the PN junction 106 and the figure of merit $V_\pi L$ as to the above-described optical phase modulator 100. In FIG. 3, each minus sign of a horizontal axis of a graph represents that an offset direction of the junction interface 106a of the PN junction 106 is a minus direction. It can be said that the smaller $V_\pi L$ is, the higher performance of the optical phase modulator is. As shown in FIG. 3, in the optical phase modulator 100 of the present embodiment, the larger offset amount of the junction interface 106a of the PN junction 106 in the minus direction becomes, the smaller $V_\pi L$ becomes. For example, whereas when the offset amount is zero, $V_\pi L$ is 0.52 Vcm, when the offset amount is −150 nm, $V_\pi L$ is 0.28 Vcm. As described above, the junction interface 106a of the PN junction 106 is offset in the minus direction, thereby reducing $V_\pi L$ and allowing the modulation efficiency of the optical phase modulator 100 to be enhanced. In addition, since a length of the modulator required to obtain a desired change in refractive index is shortened, the size of the optical phase modulator 100 can be made small.

Figure 4:
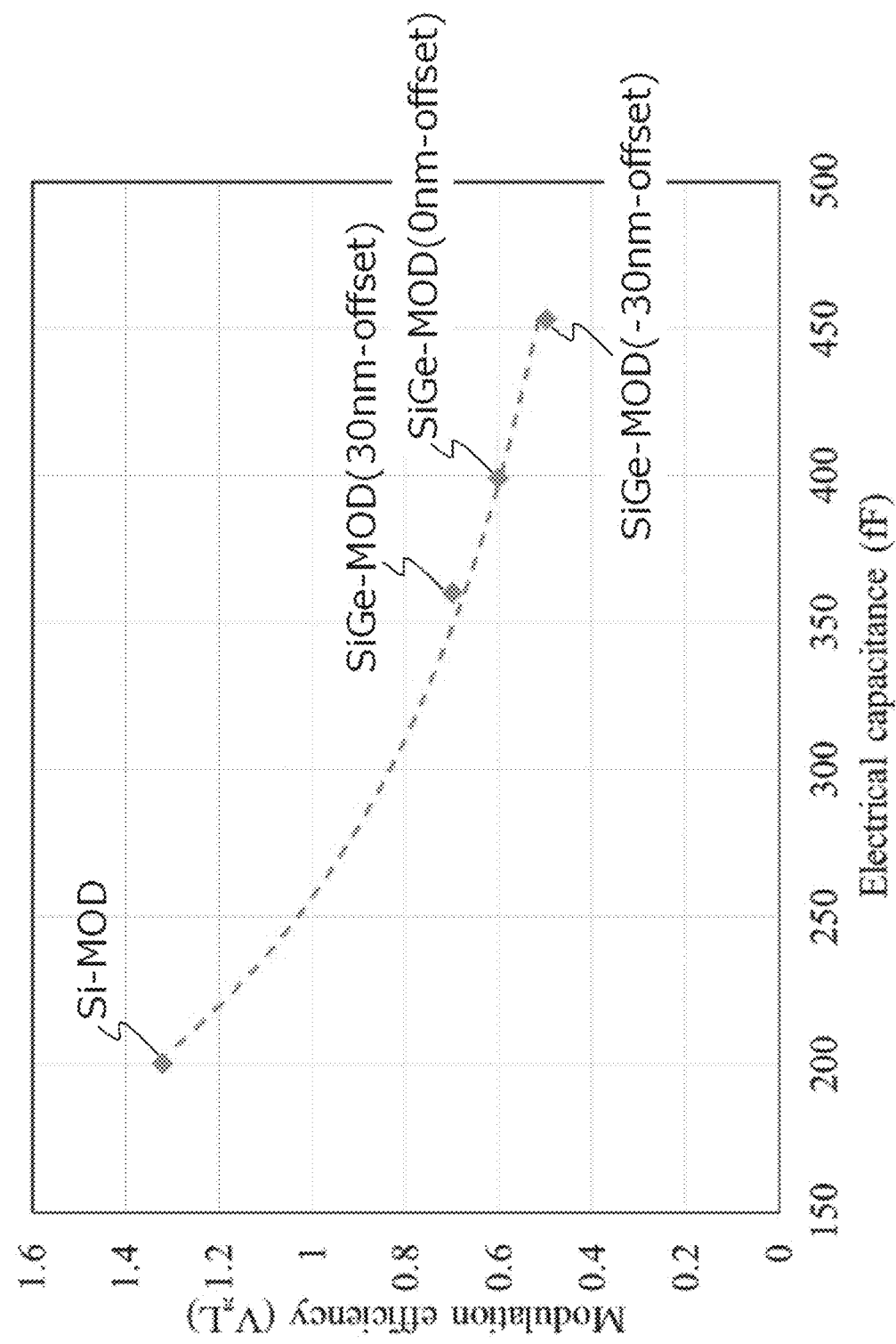
FIG. 4 shows illustrative experimental results of relationship between an electrical capacitance C of the PN junction 106 and a modulation efficiency (the figure of merit) $V_\pi L$.

FIG. 4 shows illustrative experimental results of the relationship between the electrical capacitance C of the PN junction and the modulation efficiency (the figure of merit) $V_\pi L$ as to optical phase modulators, which have several different structures, including an optical phase modulator 100 described above. In FIG. 4, a measured value noted with "SiGe-MOD (−30 nm-offset)" shows a result as to an optical phase modulator 100 in which the junction interface 106a of the PN junction 106 is offset by 30 nm in the minus direction, a measured value noted with "SiGe-MOD (30 nm-offset)" shows a result as to an optical phase modulator 100 in which the junction interface 106a of the PN junction 106 is offset by 30 nm in a plus direction, and a measured value noted with "SiGe-MOD (0 nm-offset) shows a result as to an optical phase modulator 100 in which the junction interface 106a of the PN junction 106 is not offset. Note, however, that the plus direction refers to a direction opposite to the minus direction, that is, a direction in which the junction interface 106a of the PN junction 106 is offset to a side of the n-type Si region 132 further than the center 108a of the p-type $Si_{1-x}Ge_x$ layer 108. In addition, in FIG. 4, a measured value noted with "Si-MOD" shows a result as to an optical phase modulator having a structure in which the $Si_{1-x}Ge_x$ layer 108 is not provided on the PN junction 106, as reference.

Each of the optical phase modulators 100 used to obtain the experimental results shown in FIG. 4 was prepared by the below-described manufacturing method. Specifically, by employing an ultra-high-vacuum CVD method, an $Si_{0.8}Ge_{0.2}$/Si layer was superposed on a PN junction 106. In addition, during film formation of the $Si_{0.8}Ge_{0.2}$/Si layer, diborane ($B_2H_6$) gas was mixed therewith, thereby doping the $Si_{0.8}Ge_{0.2}$/Si layer with boron (B). The p-type $Si_{0.8}Ge_{0.2}$ layer 108 was thus formed.

When the above-described manufacturing method is employed, hetero-junction of the Si PN junction 106 and the $Si_{0.8}Ge_{0.2}$ layer 108 is comparatively favorably formed. Therefore, a position of the junction interface 106a of the PN junction 106 is offset in the minus direction, and the contact area where the p-type $Si_{0.8}Ge_{0.2}$ layer 108 and the n-type Si region 132 contact each other is made large, thereby allowing the electrical capacitance C of the PN junction 106 to be increased. Accordingly, as described above in regard to the formula (3), the modulation efficiency of the optical phase modulator 100 can be greatly ameliorated. The experimental results shown in FIG. 4 sustain this, and in the case of the configuration of the "SiGe-MOD (−30 nm-offset)", it is shown that the electrical capacitance C is increased and the figure of merit $V_\pi L$ is decreased (in other words, the modulation efficiency is ameliorated).

Figure 5:
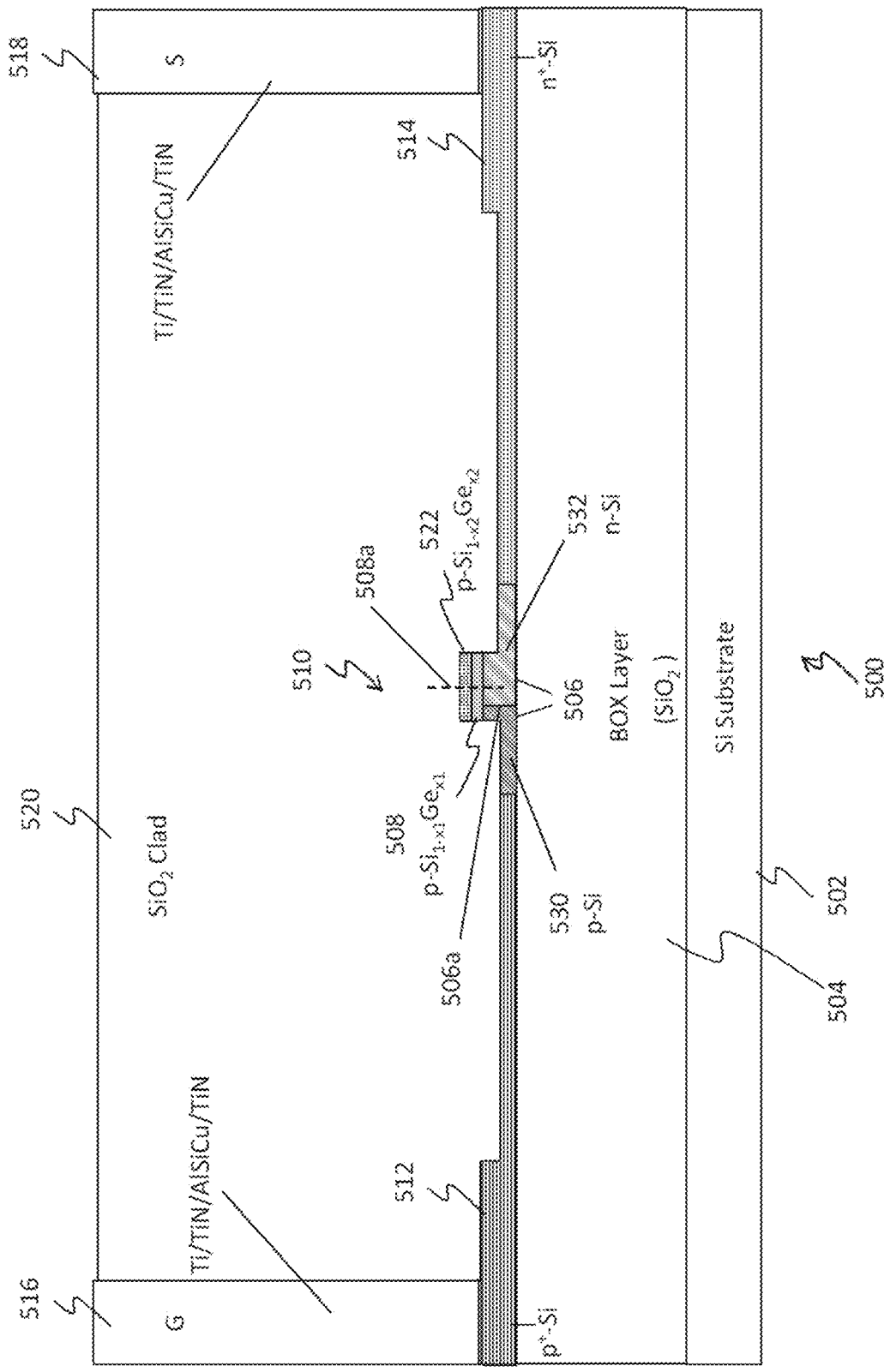
FIG. 5 is a cross-sectional view schematically illustrating an optical phase modulator 500 according to another embodiment of the present invention.

FIG. 5 is a cross-sectional view schematically illustrating an optical phase modulator 500 according to another embodiment of the present invention. A structure of the optical phase modulator 500 is similar to that of the optical phase modulator 100 shown in FIG. 1 except that two p-type SiGe layers (a p-type $Si_{1-x1}Ge_{x1}$ layer 508 and a p-type $Si_{1-x2}Ge_{x2}$ layer 522) are superposed on a PN junction 506. A rate of Ge in the p-type $Si_{1-x2}Ge_{x2}$ layer 522 may be smaller than a rate of Ge in the p-type $Si_{1-x1}Ge_{x1}$ layer 508 (that is, x1>x2). For example, the p-type $Si_{1-x1}Ge_{x1}$ layer 508 may be a p-type $Si_{0.7}Ge_{0.3}$ layer, and the p-type $Si_{1-x2}Ge_{x2}$ layer 522 may be a p-type $Si_{0.8}Ge_{0.2}$ layer. In addition, the p-type $Si_{1-x2}Ge_{x2}$ layer 522 may be an Si layer. As in FIG. 1, in FIG. 5, an Si substrate 502, a BOX layer 504, a PN junction 506, a p-type Si region 530, an n-type Si region 532, a first electrode 512, a second electrode 514, a grounding electrode 516, a signal electrode 518, and a clad 520 are illustrated, and a position of a junction interface 506a of the PN junction 506 is offset in a direction of the p-type Si region 530 (that is, a minus direction) from a center 508a of the p-type $Si_{1-x1}Ge_{x1}$ layer 508. The PN junction 506 may be formed of $Si_{1-y}Ge_y$. The rib-type waveguide structure 510 may include a PIN junction, instead of the PN junction. A conductive type of each of the $Si_{1-x1}Ge_{x1}$ layer 508 and the $Si_{1-x2}Ge_{x2}$ layer 522 may be an n-type.

In the optical phase modulator 500 shown in FIG. 5, by increasing a thickness of each of the p-type SiGe layers 508 and 522, large strain can be induced. However, when the thickness of each of the SiGe layers superposed on the Si layer has reached a certain film thickness, an absolute amount of the strain of each of the SiGe layers is extremely increased, and bonding in an interface between the Si layer and each of the SiGe layers is broken (which is called lattice relaxation). Accordingly, there is a limit to a thickness of each of the strained SiGe layers which can be superposed thereon (a critical thickness).

By gradually changing composition of each of the SiGe layers in a film thickness direction, lattice defects can be reduced. Accordingly, it is effective to superpose the plurality of SiGe layers which respectively have different kinds of composition. On the other hand, when a rate of the Ge composition is increased, each of the SiGe layers tends to have chemically unstable nature, for example, in which a Ge oxide film dissolves in water. Accordingly, it is useful to use a layer having a small rate of the Ge composition as a topmost layer of the SiGe layers since the topmost layer functions as a protective film. Accordingly, when the plurality of SiGe layers are superposed thereon, it is effective to superpose the layer having the small rate of the Ge composition and the Si layer on a layer having a large rate of the Ge composition.

Figure 6:
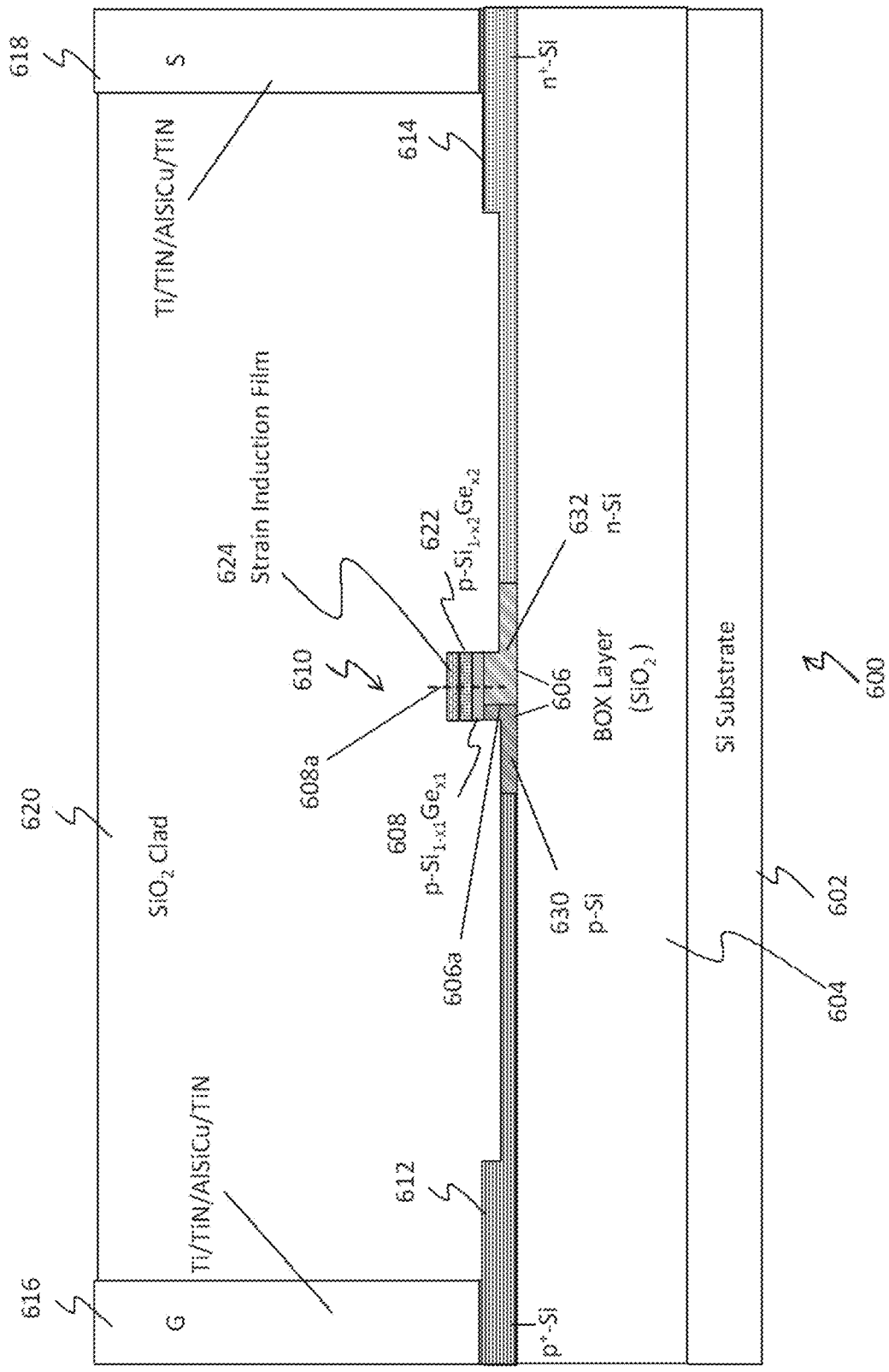
FIG. 6 is a cross-sectional view schematically illustrating an optical phase modulator 600 according to still another embodiment of the present invention.

FIG. 6 is a cross-sectional view schematically illustrating an optical phase modulator 600 according to still another embodiment of the present invention. A structure of the optical phase modulator 600 is similar to that of the optical phase modulator 500 shown in FIG. 5 except that a strain induction film 624 is superposed on a p-type $Si_{1-x2}Ge_{x2}$ layer 622. In the optical phase modulator 600 shown in FIG. 6, instead of superposing the thick SiGe layer, the strain induction film 624 is superposed, thereby enabling large strain. The strain induction film 624 may include, for example, $SiN_x$ or alumina. As in FIG. 5, in FIG. 6, an Si substrate 602, a BOX layer 604, a PN junction 606, a p-type Si region 630, an n-type Si region 632, a p-type $Si_{1-x1}Ge_{x1}$ layer 608, a first electrode 612, a second electrode 614, a grounding electrode 616, a signal electrode 618, and a clad 620 are illustrated, and a position of a junction interface 606a of the PN junction 606 is offset in a direction of the p-type Si region 630 (that is, a minus direction) from a center 608a of the p-type $Si_{1-x1}Ge_{x1}$ layer 608. The PN junction 606 may be formed of $Si_{1-y}Ge_y$. The rib-type waveguide structure 610 may include a PIN junction, instead of the PN junction. A conductive type of each of the $Si_{1-x1}Ge_{x1}$ layer 608 and the $Si_{1-x2}Ge_{x2}$ layer 622 may be an n-type.

Figure 7:
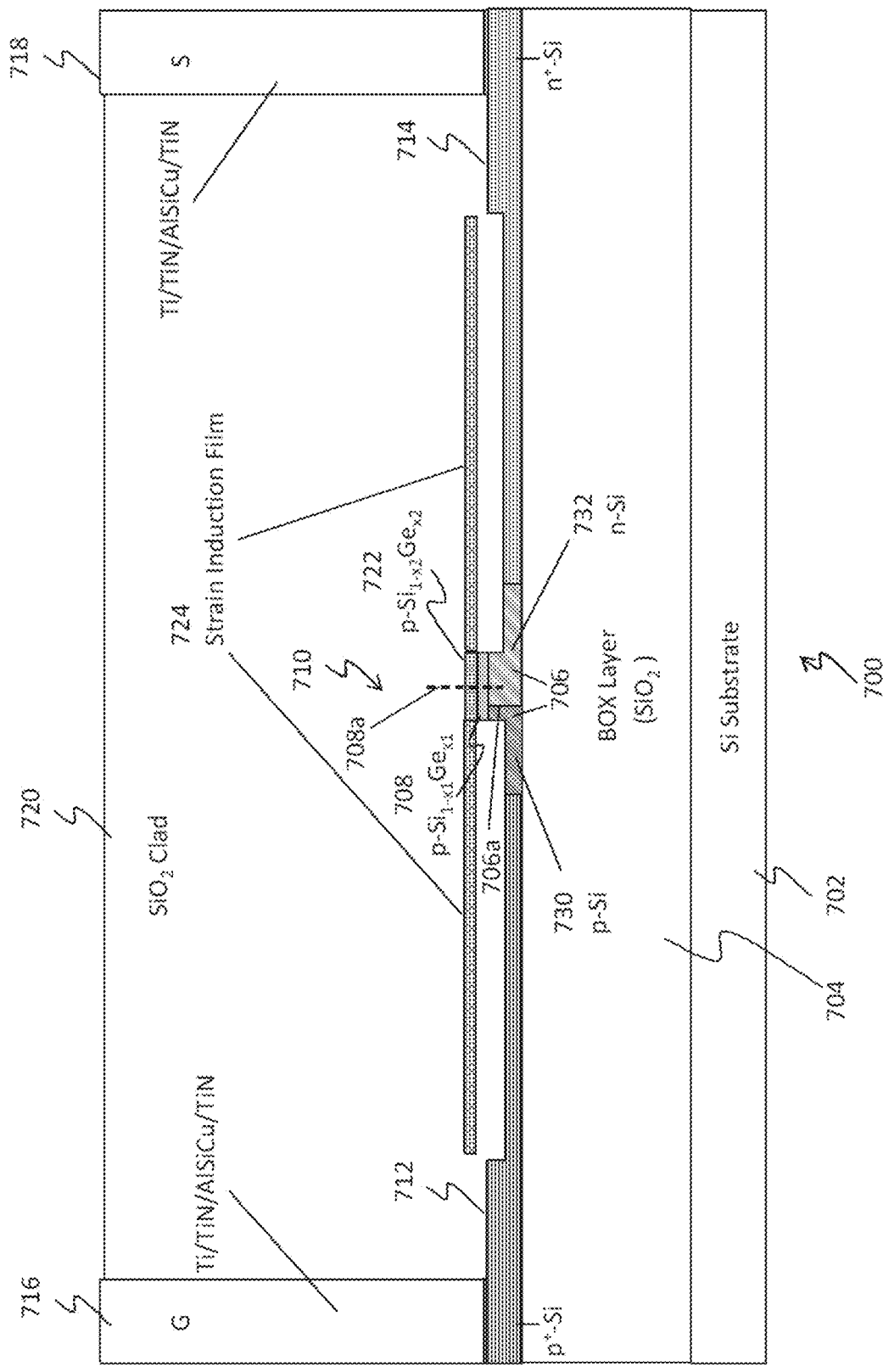
FIG. 7 is a cross-sectional view schematically illustrating an optical phase modulator 700 according to yet another embodiment of the present invention.

FIG. 7 is a cross-sectional view schematically illustrating an optical phase modulator 700 according to yet another embodiment of the present invention. A structure of the optical phase modulator 700 is similar to that of the optical phase modulator 500 shown in FIG. 5 except that a strain induction film 724 neighboring side surfaces of a p-type $Si_{1-x2}Ge_{x2}$ layer 722 is formed. As shown in FIG. 7, the strain induction film 724 may extend from over a PN junction 706 to over a first electrode 712 and a second electrode 714. The strain induction film 724 may be formed in such a way as to neighbor side surfaces of a p-type $Si_{1-x1}Ge_{x1}$ layer 708. In the optical phase modulator 700 shown in FIG. 7, instead of superposing a thick SiGe layer, the strain induction film layer 724 is formed, thereby enabling large strain. The strain induction film 724 may include, for example, $SiN_x$ or alumina. As in FIG. 5, in FIG. 7, an Si substrate 702, a BOX layer 704, a PN junction 706, a p-type Si region 730, an n-type Si region 732, a p-type $Si_{1-x1}Ge_{x1}$ layer 708, a first electrode 712, a second electrode 714, a grounding electrode 716, a signal electrode 718, and a clad 720 are illustrated, and a position of a junction interface 706a of the PN junction 706 is offset in a direction of the p-type Si region 730 (that is, a minus direction) from a center 708a of the p-type $Si_{1-x1}Ge_{x1}$ layer 708. The PN junction 706 may be formed of $Si_{1-y}Ge_y$. The rib-type waveguide structure 710 may include a PIN junction, instead of the PN junction. A conductive type of each of the $Si_{1-x1}Ge_{x1}$ layer 708 and the $Si_{1-x2}Ge_{x2}$ layer 722 may be an n-type.

Figure 8:
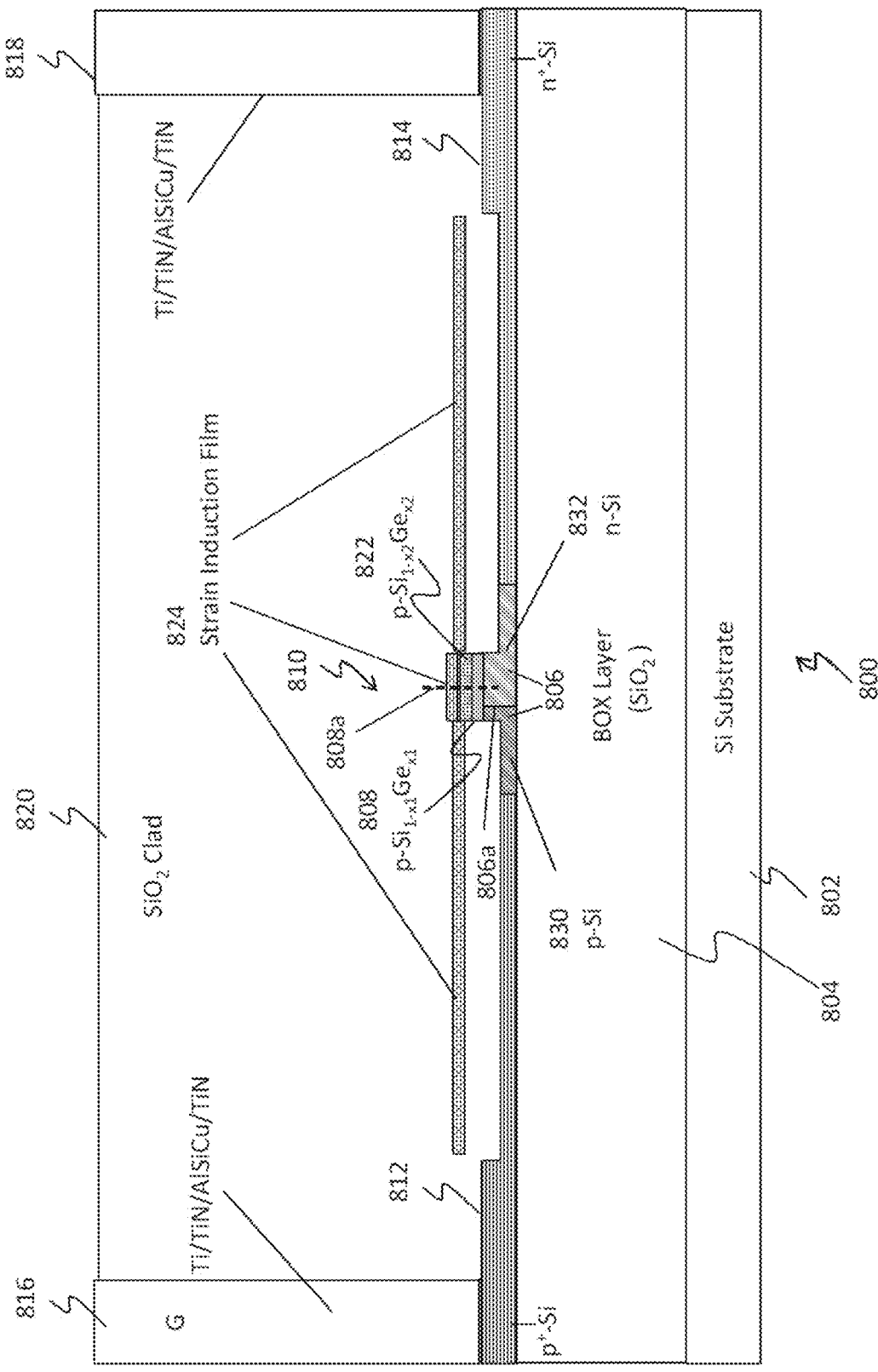
FIG. 8 is a cross-sectional view schematically illustrating an optical phase modulator 800 according to a further embodiment of the present invention.

FIG. 8 is a cross-sectional view schematically illustrating an optical phase modulator 800 according to a further embodiment of the present invention. A structure of the optical phase modulator 800 is similar to that of the optical phase modulator 500 shown in FIG. 5 except that a strain induction film 824 on a p-type $Si_{1-x2}Ge_{x2}$ layer 822 and neighboring side surfaces thereof is formed. As with the optical phase modulator 600 shown in FIG. 6, the strain induction film 824 is superposed on the p-type $Si_{1-x2}Ge_{x2}$ layer 822. As with the optical phase modulator 700 shown in FIG. 7, the strain induction film 824 is formed also in such a way as to neighbor the side surfaces of the p-type $Si_{1-x2}Ge_{x2}$ layer 822. The strain induction film 824 may extend from over a PN junction 806 to over a first electrode 812 and a second electrode 814. The strain induction film 824 may be formed in such a way as to neighbor side surfaces of a p-type $Si_{1-x1}Ge_{x1}$ layer 808. In the optical phase modulator 800 shown in FIG. 8, instead of superposing a thick SiGe layer, the strain induction film layer 824 is formed, thereby enabling large strain. The strain induction film 824 may include, for example, SiN or alumina. As in FIG. 5, in FIG. 8, an Si substrate 802, a BOX layer 804, a PN junction 806, a p-type Si region 830, an n-type Si region 832, a first electrode 812, a second electrode 814, a grounding electrode 816, a signal electrode 818, and a clad 820 are illustrated, and a position of a junction interface 806a of the PN junction 806 is offset in a direction of the p-type Si region 830 (that is, a minus direction) from a center 808a of the p-type $Si_{1-x1}Ge_{x1}$ layer 808. The PN junction 806 may be formed of $Si_{1-y}Ge_y$. The rib-type waveguide structure 810 may include a PIN junction, instead of the PN junction. A conductive type of each of the $Si_{1-x1}Ge_{x1}$ layer 808 and the $Si_{1-x2}Ge_{x2}$ layer 822 may be an n-type.

Figure 9:
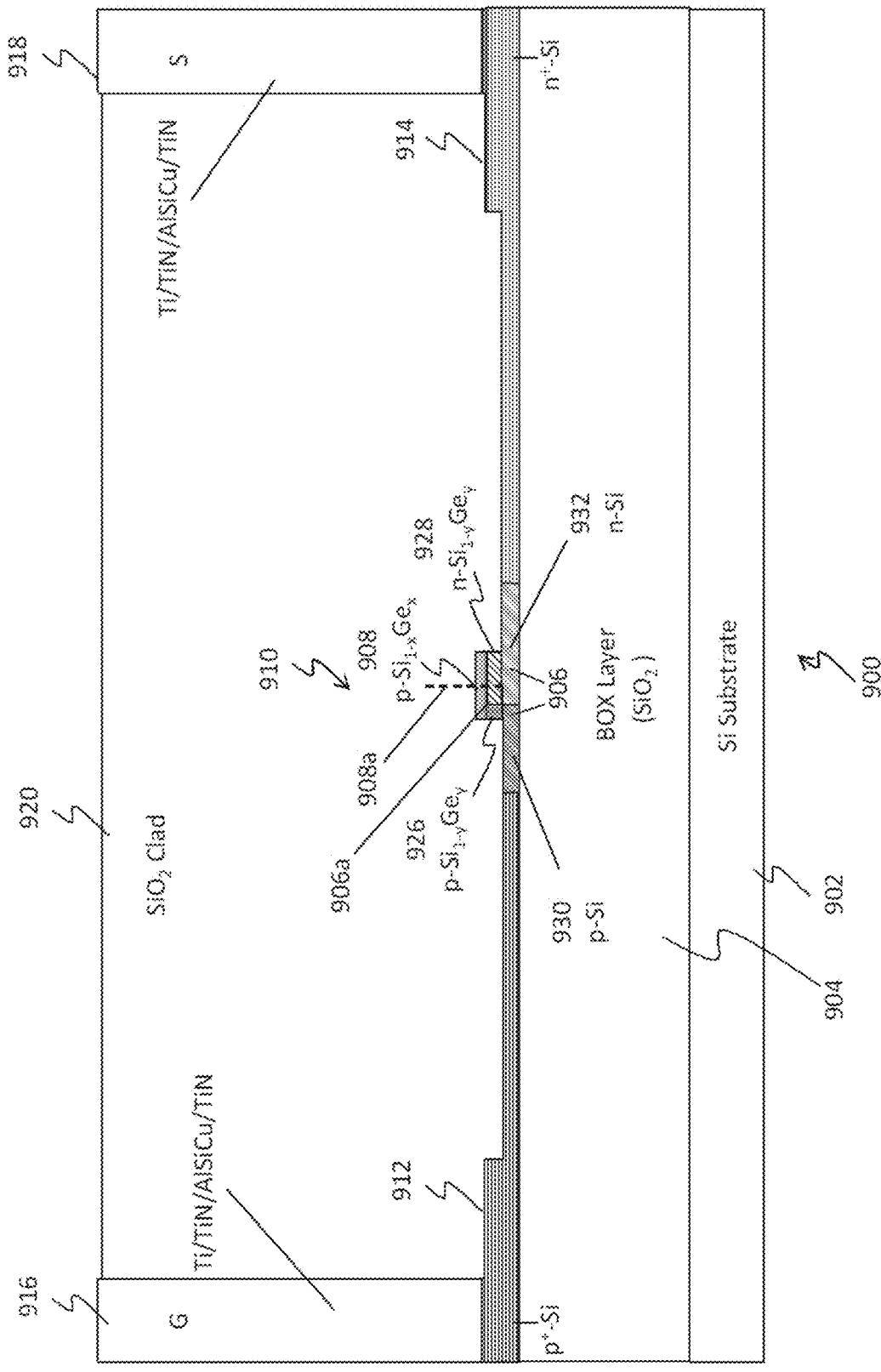
FIG. 9 is a cross-sectional view schematically illustrating an optical phase modulator 900 according to a still further embodiment of the present invention.

FIG. 9 is a cross-sectional view schematically illustrating an optical phase modulator 900 according to a still further embodiment of the present invention. A structure of the optical phase modulator 900 is similar to that of the optical phase modulator 100 shown in FIG. 1 except that a PN junction 906 includes a p-type $Si_{1-y}Ge_y$ layer 926 and an n-type $Si_{1-y}Ge_y$ layer 928. Note, however, that a structure of the layers included in the PN junction 906 is not limited to the above-mentioned configuration. In each of the p-type $Si_{1-y}Ge_y$ layer 926 and the n-type $Si_{1-y}Ge_y$ layer 928, a rate of Ge can be any value. In addition, the p-type $Si_{1-x}Ge_x$ layer 908 may include two or more p-type $Si_{1-x}Ge_x$ layers (p-type $Si_{0.7}Ge_{0.3}$ layer, p-type $Si_{0.8}Ge_{0.2}$ layer, and the like). As in FIG. 1, in FIG. 9, an Si substrate 902, a BOX layer 904, a p-type Si region 930, an n-type Si region 932, a first electrode 912, a second electrode 914, a grounding electrode 916, a signal electrode 918, and a clad 920 are illustrated, and a position of a junction interface 906a of the PN junction 906 is offset in a direction of the p-type Si region 930 (that is, a minus direction) from a center 908a of the p-type $Si_{1-x1}Ge_{x1}$ layer 908. The rib-type waveguide structure 910 may include a PIN junction, instead of the PN junction. A conductive type of the $Si_{1-x}Ge_x$ layer 908 may be an n-type. A rate of Ge composition in each of the p-type $Si_{1-y}Ge_y$ layer 926 and the n-type $Si_{1-y}Ge_y$ layer 928 may be smaller than a rate of Ge composition in the p-type $Si_{1-x}Ge_x$ layer 908. For example, the rate of the Ge composition in each of the p-type $Si_{1-y}Ge_y$ layer 926 and the n-type $Si_{1-y}Ge_y$ layer 928 may be 10% to 20%, and the rate of the Ge composition in the p-type $Si_{1-x}Ge_x$ layer 908 may be 30% to 50%. Also in the optical phase modulator 900 shown in FIG. 9, as in FIGS. 6 to 8, on the p-type $Si_{1-x}Ge_x$ layer 908 and/or on side surfaces thereof, a strain induction film may be formed. The PN junction 906 is constituted of a layered structure of a PN junction formed of Si and a PN junction formed of $Si_{1-y}Ge_y$. In the present embodiment, since the PN junction 906 includes the SiGe layers, a refractive index of the PN junction 906 is increased, as compared with that of the optical phase modulator 100 shown in FIG. 1. Accordingly, according to the present embodiment, light confinement effect is further strengthened, thereby further increasing an optical modulation efficiency.

Figure 10:
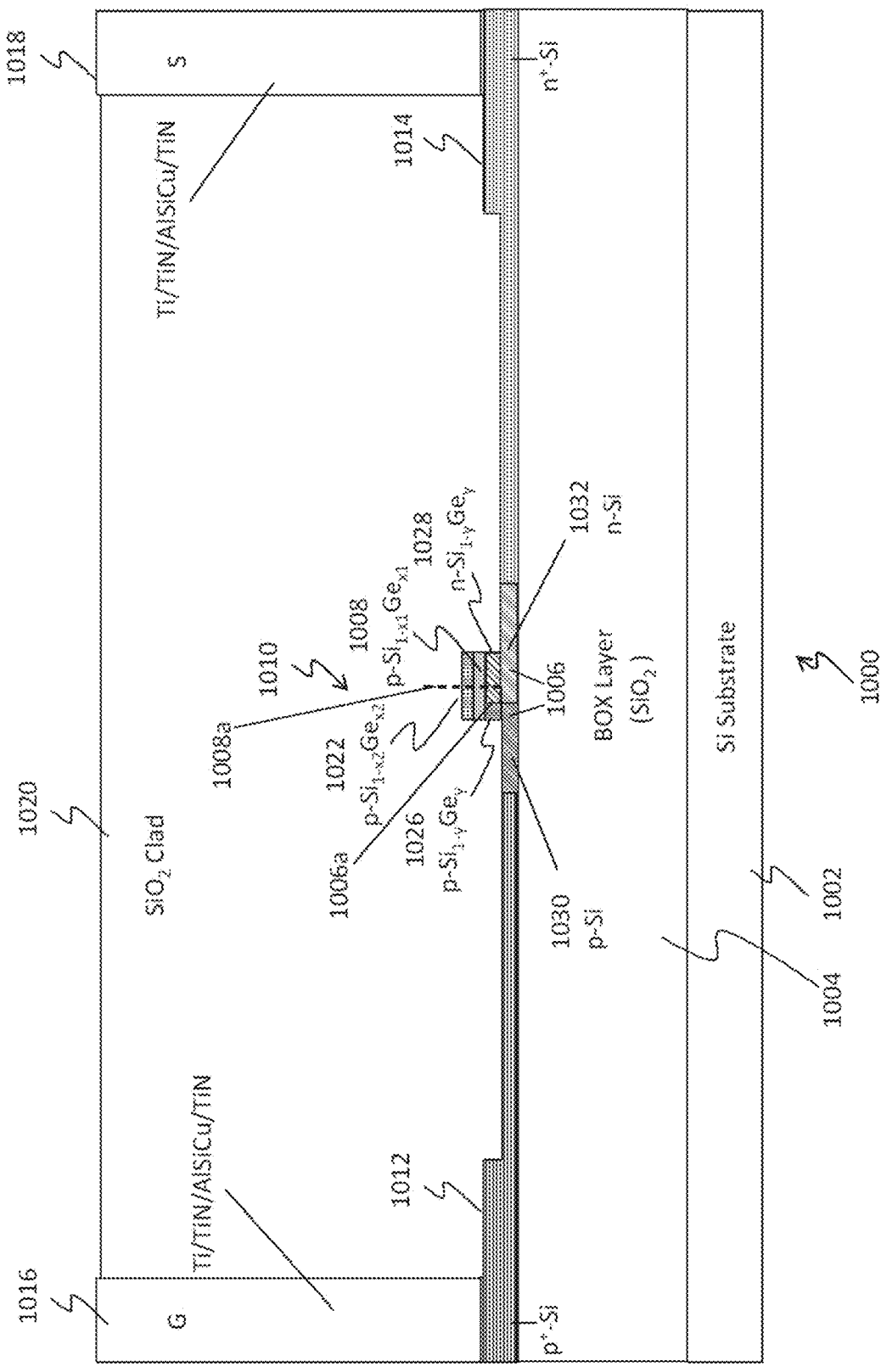
FIG. 10 is a cross-sectional view schematically illustrating an optical phase modulator 1000 according to a yet further embodiment of the present invention.

FIG. 10 is a cross-sectional view schematically illustrating an optical phase modulator 1000 according to a yet further embodiment of the present invention. A structure of the optical phase modulator 1000 is similar to that of the optical phase modulator 900 shown in FIG. 9 except that a p-type $Si_{1-x2}Ge_{x2}$ layer 1022 is superposed on a p-type $Si_{1-x1}Ge_{x1}$ layer 1008. A structure of the layers included in a PN junction 1006 is not limited to a configuration shown in FIG. 10. In each of a p-type $Si_{1-y}Ge_y$ layer 1026 and an n-type $Si_{1-y}Ge_y$ layer 1028, a rate of Ge can be any value. As in FIG. 9, in FIG. 10, an Si substrate 1002, a BOX layer 1004, a p-type Si region 1030, an n-type Si region 1032, a first electrode 1012, a second electrode 1014, a grounding electrode 1016, a signal electrode 1018, and a clad 1020 are illustrated, and a position of a junction interface 1006a of the PN junction 1006 is offset in a direction of the p-type Si region 1030 (that is, a minus direction) from a center 1008a of the p-type $Si_{1-x1}Ge_{x1}$ layer 1008. The rib-type waveguide structure 1010 may include a PIN junction, instead of the PN junction. A conductive type of each of the $Si_{1-x1}Ge_{x1}$ layer 1008 and the $Si_{1-x2}Ge_{x2}$ layer 1022 may be an n-type. Also in the optical phase modulator 1000 shown in FIG. 10, as in FIGS. 6 to 8, on the p-type $Si_{1-x2}Ge_{x2}$ layer 1022 and/or on side surfaces thereof as well as/or on side surfaces of the p-type $Si_{1-x1}Ge_{x1}$ layer 1008, a strain induction film may be formed. In the present embodiment, since the PN junction 1006 includes the SiGe layers, a refractive index of the PN junction 1006 increases, as compared with a refractive index of the PN junction formed only of Si. Accordingly, according to the present embodiment, light confinement effect is further strengthened, thereby further increasing an optical modulation efficiency.

One embodiment of the present invention is an optical intensity modulator which includes the optical phase modulator according to each of the embodiments of the present invention described above. For example, the optical phase modulator 100 shown in FIG. 1 is used at one arm or both arms of the Mach-Zehnder interferometer, thereby allowing the optical intensity modulator to be configured. The optical phase modulator according to each of the other embodiments of the present invention also can be used to configure the optical intensity modulator. The configuration of the optical intensity modulator according to each of the embodiments of the present invention is not limited to each of the above-described configurations. It is understood that by employing a method known by those skilled in the art, the optical phase modulator of the present invention is applied to the optical intensity modulator, thereby allowing the optical intensity modulator including features of the present invention to be obtained.

In one embodiment of the present invention, the rate of Ge of the $Si_{1-x}Ge_x$ layer (108, 508, 608, 708, 808, 908, and 1008) may be set in a range of $0 \leq x < 0.6$. Since when x which is the rate of Ge is equal to or greater than 0.6, light absorption becomes remarkable, the rate of Ge is set in the range of $0 \leq x < 0.6$, thereby allowing an increase in an insertion loss of the optical phase modulator to be inhibited.

In one embodiment of the present invention, crystal orientation of each of the silicon substrates (102, 502, 602, 702, 802, 902, and 1002) may be <110>. The crystal orientation is set to <110>, thereby increasing mobility of free carriers and decreasing the light absorption. Thus, the optical phase modulator whose speed is high and whose loss is low can be realized.

With reference to FIG. 11A to FIG. 11H, processes of manufacturing the optical phase modulator 100, shown in FIG. 1, according to the embodiment of the present invention will be explained.

Figure 11A:
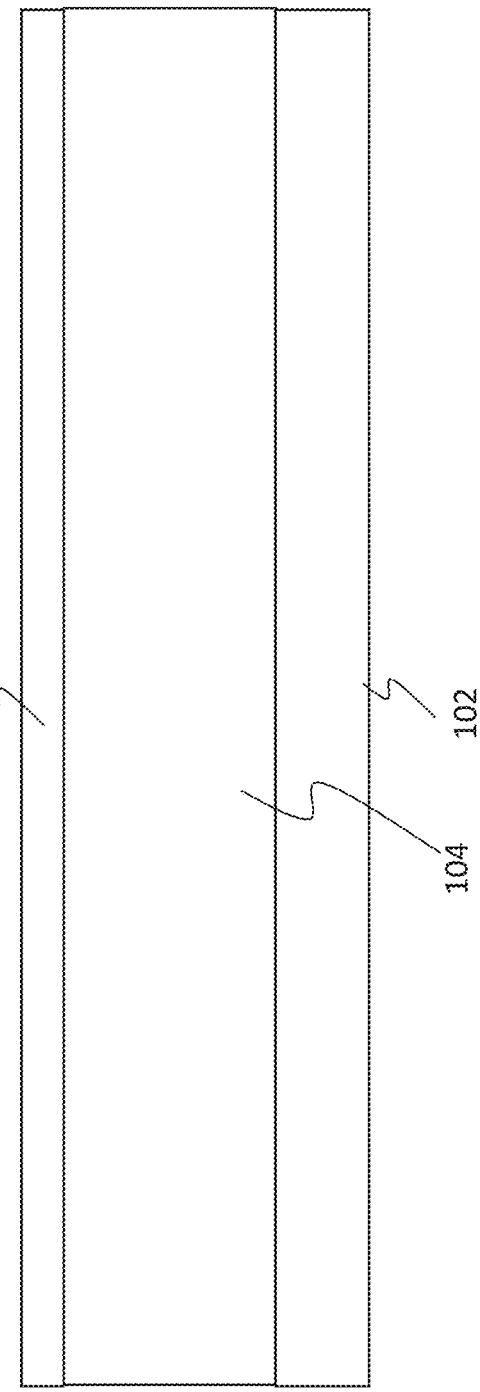
FIG. 11A is a diagram explaining a process of manufacturing the optical phase modulator according to the embodiment of the present invention illustrated in FIG. 1.

FIG. 11A illustrates a configuration of the substrate used in the embodiment of the present invention. The substrate is constituted of an SOI substrate which includes the Si layer 105 superposed on the BOX layer (thermal oxide film) 104 superposed on the Si substrate 102.

Figure 11B:
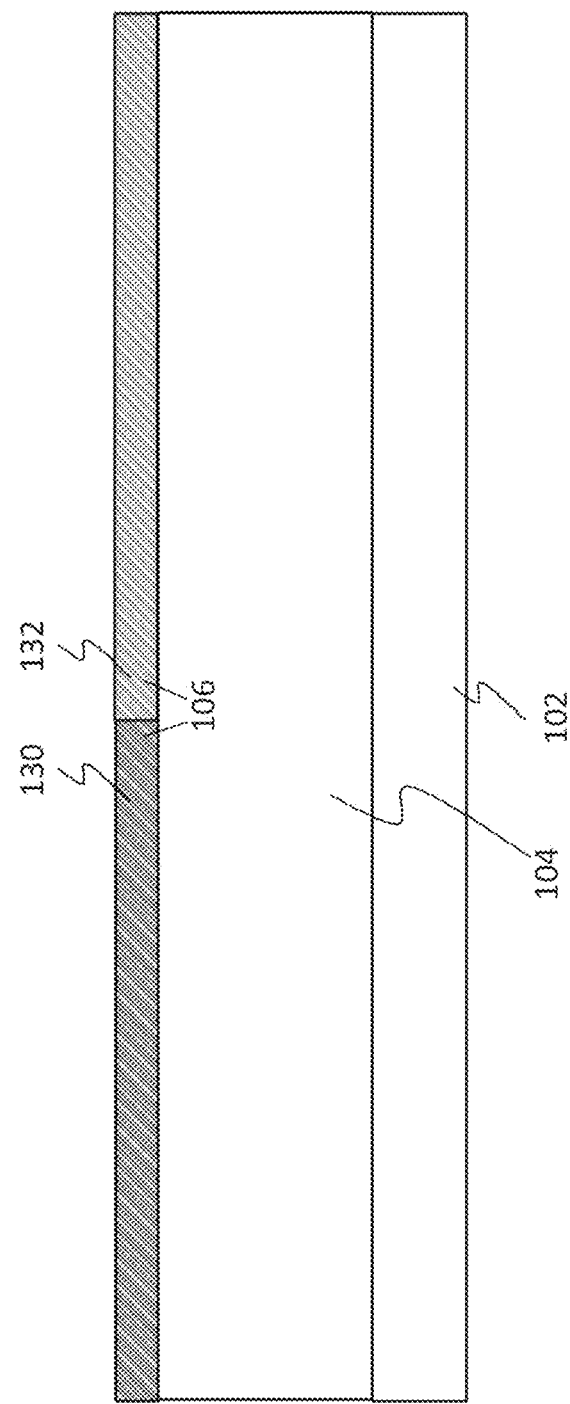
FIG. 11B is a diagram explaining a process of manufacturing the optical phase modulator according to the embodiment of the present invention illustrated in FIG. 1.

In FIG. 11B, one part of the Si layer 105 is doped (for example, by boron or the like), thereby forming the p-type Si region 130. In addition, another part of the Si layer 105 is doped (for example, by phosphorus or the like), thereby forming the n-type Si region 132. Thus, the PN junction 106 which is formed of Si in a lateral direction on the substrate is formed. The PN junction 106 may be formed of $Si_{1-y}Ge_y$. Instead of the PN junction, the PIN junction may be formed.

Figure 11C:
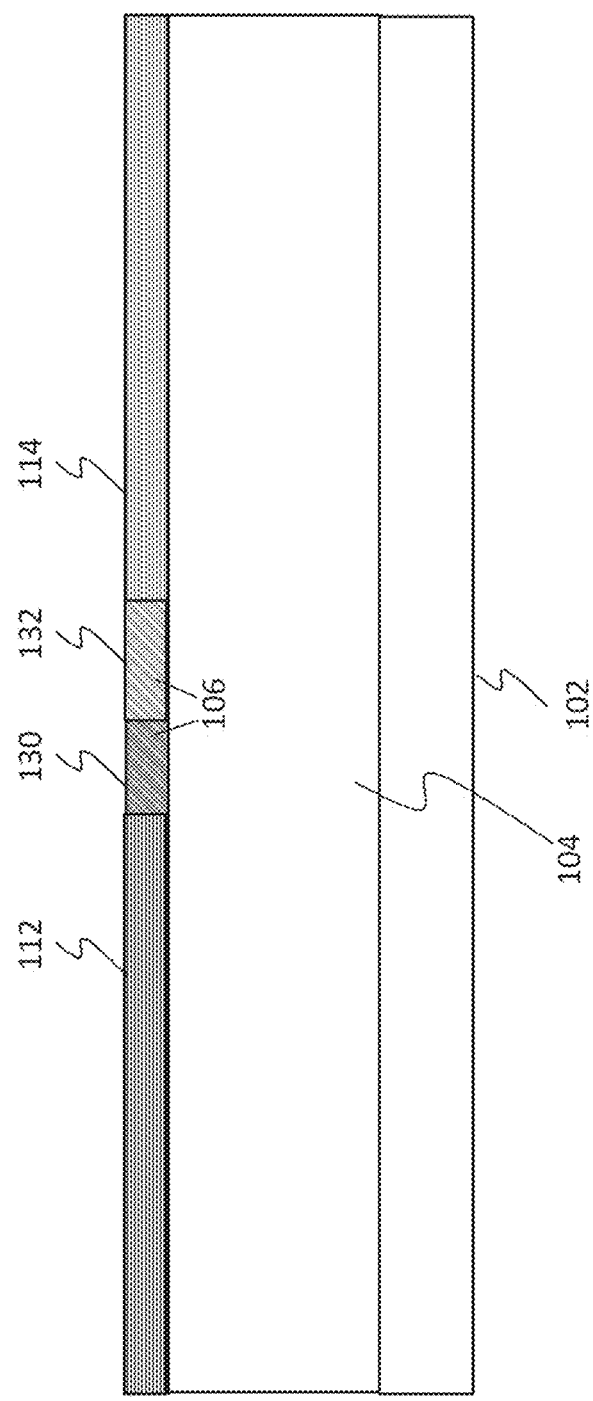
FIG. 11C is a diagram explaining a process of manufacturing the optical phase modulator according to the embodiment of the present invention illustrated in FIG. 1.

In FIG. 11C, one part of the p-type Si region 130, which neighbors the PN junction 106, is further p-type-doped to thereby increase a doping concentration thereof, thereby forming the p-type electrode 112. In addition, one part of the n-type Si region 132, which neighbors the PN junction 106, is further n-type-doped to thereby increase a doping concentration thereof, thereby forming the n-type electrode 114.

In FIG. 11D, parts of the PN junction 106, the p-type electrode 112, and the n-type electrode 114 are etched.

Figure 11E:
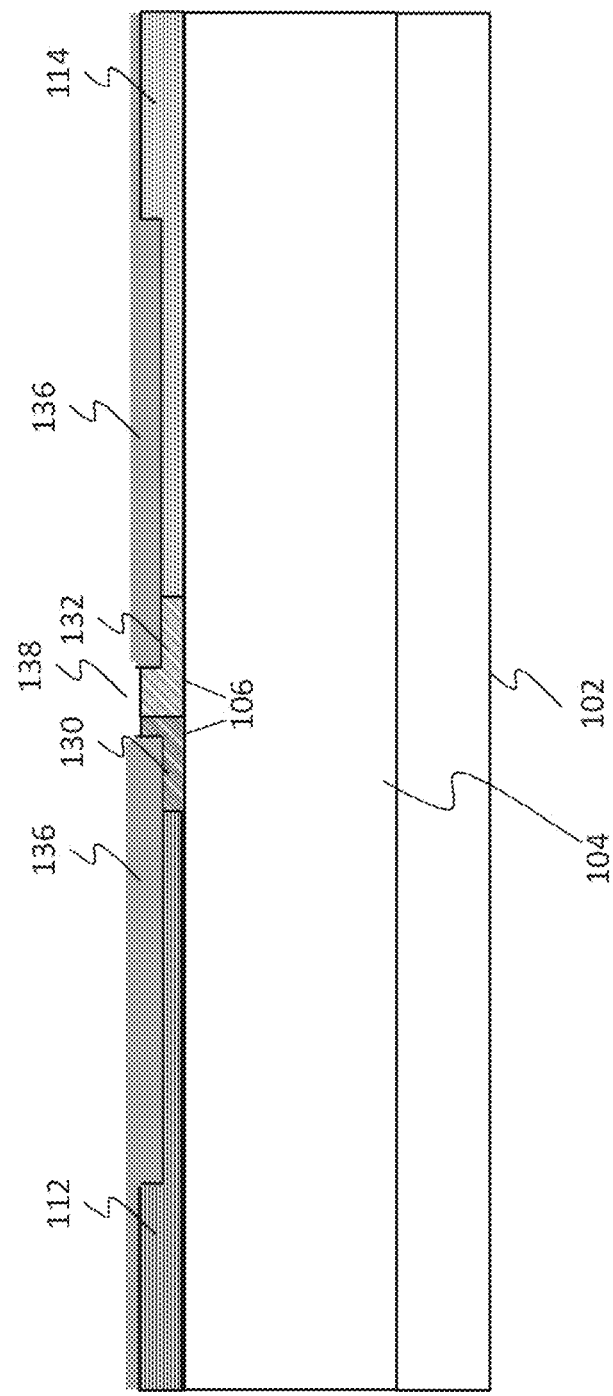
FIG. 11E is a diagram explaining a process of manufacturing the optical phase modulator according to the embodiment of the present invention illustrated in FIG. 1.

In FIG. 11E, an oxide-film mask layer 136 is formed on the etched parts. Furthermore, the oxide-film mask layer on the PN junction 106 is removed, and a recess 138 is formed.

Figure 11F:
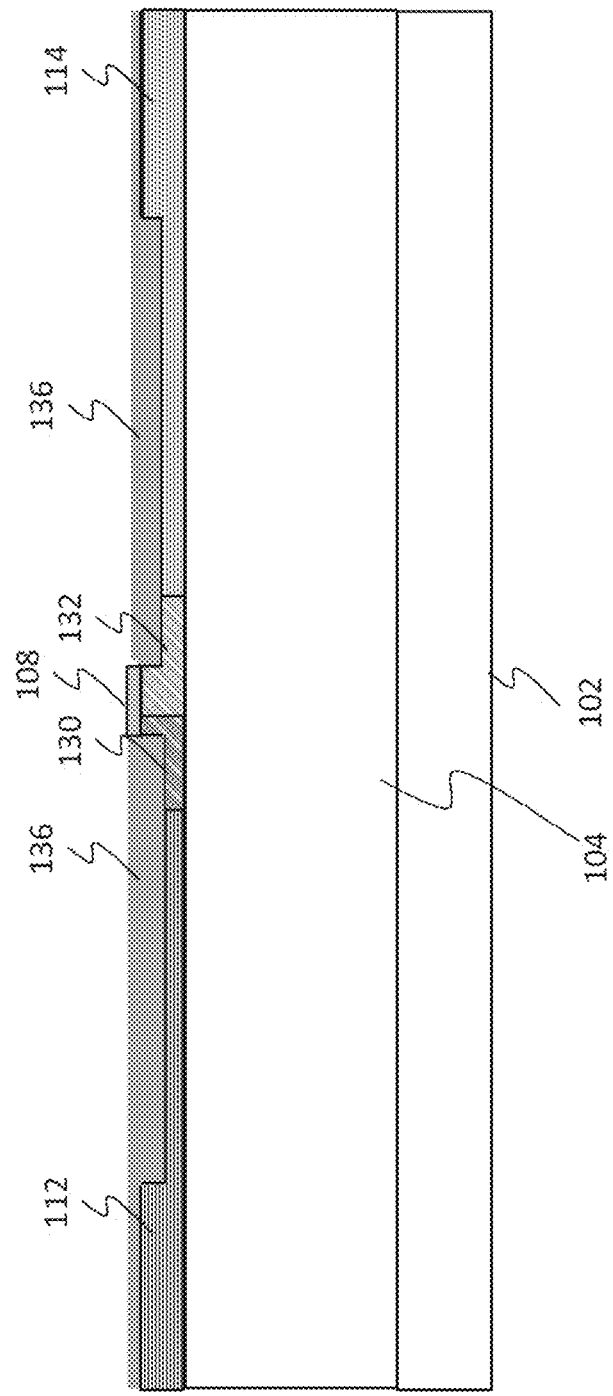
FIG. 11F is a diagram explaining a process of manufacturing the optical phase modulator according to the embodiment of the present invention illustrated in FIG. 1.

In FIG. 11F, the $Si_{1-x}Ge_x$ layer which is constituted of at least one layer is formed in the recess 138. This layer is p-type-doped, thereby forming the p-type $Si_{1-x}Ge_x$ layer 108. Accordingly, the p-type $Si_{1-x}Ge_x$ layer 108 is electrically connected to the PN junction 106.

Figure 11G:
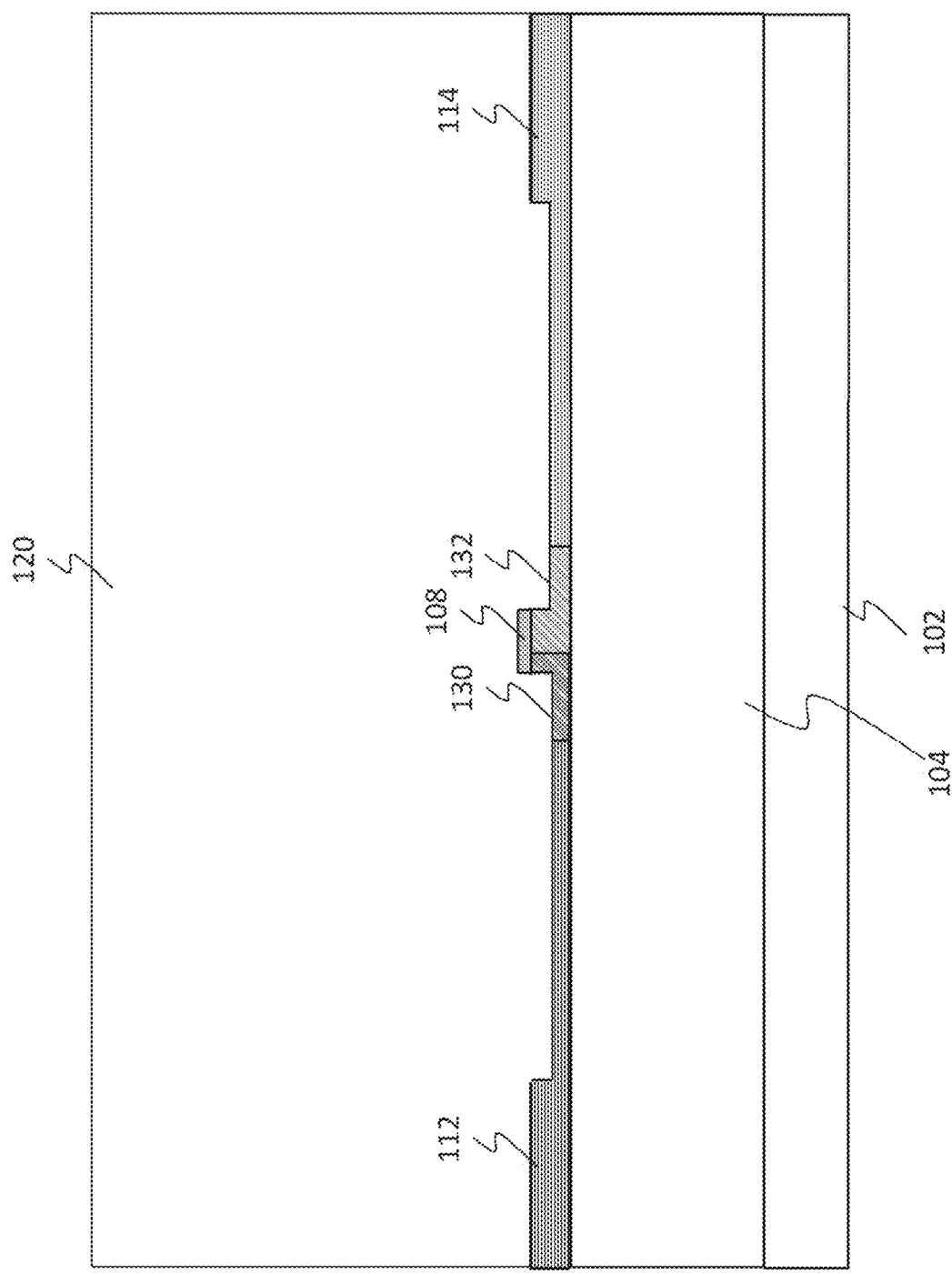
FIG. 11G is a diagram explaining a process of manufacturing the optical phase modulator according to the embodiment of the present invention illustrated in FIG. 1.
Figure 12:
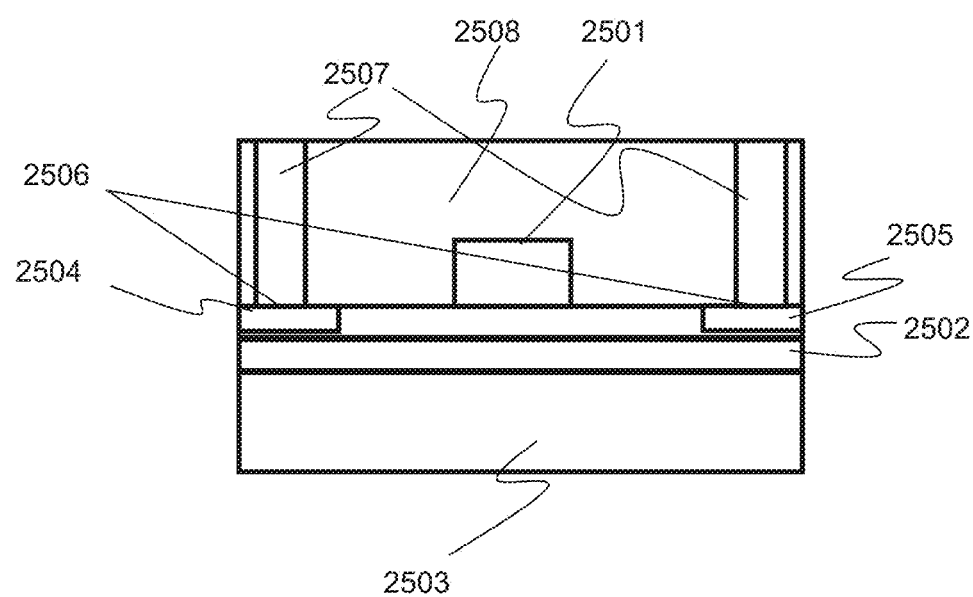
FIG. 12 is a diagram illustrating a typical example of the conventional silicon-based electro-optic phase modulator.

In FIG. 11G, the oxide-film mask layer 136 is removed, and the oxide film (for example, $SiO_2$) clad layer 120 is formed.

In FIG. 11H, the grounding electrode 116 and the signal electrode 118 are formed by use of metal wires in such a way as to contact the p-type electrode 112 and the n-type electrode 114, respectively.

The present invention is described with reference to the specific embodiments. However, it is not intended that the embodiments described in this specification are used to restrictively interpret the present invention, and it is intended that the embodiments described herein are used to illustratively explain the present invention. It is apparent to those skilled in the art that other alternative embodiments can be implemented without departing from the scope of the present invention.

The invention claimed is:

1. An optical phase modulator comprising a rib-type waveguide structure,
    the rib-type waveguide structure comprising:
    a PN junction or a PIN junction which is formed of Si or $Si_{1-y}Ge_y$ and is formed in a lateral direction on a substrate, the PN junction or the PIN junction comprising a p-type region and an n-type region; and
    a p-type $Si_{1-y}Ge_y$ layer which is constituted of at least one layer and is doped with a p-type impurity, the p-type $Si_{1-y}Ge_y$ layer being superposed on the PN junction or the PIN junction so as to be electrically connected to the PN junction or the PIN junction,
    wherein
    the rib-type waveguide structure has a substantially uniform structure along a light propagation direction, and
    in a direction parallel with the substrate and perpendicular to the light propagation direction, a position of a junction interface of the PN junction or the PIN junction is offset from a center of the p-type $Si_{1-y}Ge_y$ layer so that a contact area where the p-type $Si_{1-y}Ge_y$ layer contacts the n-type region is larger than a contact area where the p-type $Si_{1-y}Ge_y$ layer contacts the p-type region, so as to increase an electrical capacitance of the PN junction or the PIN junction.

2. The optical phase modulator according to claim 1, wherein the position of the junction interface of the PN junction or the PIN junction is offset to a direction of the p-type region.

3. The optical phase modulator according to claim 1, comprising:
    a first electrode of a first conductive type; and
    a second electrode of a second conductive type which neighbor the rib-type waveguide structure,
    wherein
    by applying a voltage to each of the first electrode and the second electrode, a carrier density in the rib-type waveguide structure is changed.

4. The optical phase modulator according to claim 1, herein the type $Si_{1-x}Ge_x$ layer being constituted of the at least one layer has lattice strain.

5. The optical phase modulator according to claim 1, wherein the PN junction or the PIN junction being formed in the lateral direction on the substrate is constituted of a layered structure of a PN junction or a PIN junction which is formed of Si and a PN junction or a PIN junction which is formed of $Si_{1-y}Ge_y$.

6. The optical phase modulator according to claim 5, wherein the PN junction or the PIN junction being formed in the lateral direction on the substrate and being constituted of the layered structure of Si and $Si_{1-y}Ge_y$ includes a rib-type waveguide structure.

7. The optical phase modulator according to claim 1, wherein the type $Si_{1-x}Ge_x$ layer being constituted of the at least one layer includes: an $Si_{1-x1}Ge_{x1}$ layer being superposed on the PN junction or the PIN junction; and an $Si_{1-x2}Ge_{x2}$ layer being superposed on the $Si_{1-x1}Ge_{x1}$ layer, and x2 is smaller than x1.

8. The optical phase modulator according to claim 1, wherein the type $Si_{1-x}Ge_x$ layer being constituted of the at least one layer includes a strain induction film being formed above the p-type $Si_{1-x}Ge_x$ layer or on a side surface thereof.

9. The optical phase modulator according to claim 1, wherein in the PN junction or the PIN junction being formed in the lateral direction on the substrate or in the type $Si_{1-x}Ge_x$ layer being constituted of the at least one layer and being superposed on the PN junction or the PIN junction so as to be electrically connected to the PN junction or the PIN junction, a doping concentration of a first conductive type is smaller than a doping concentration of a second conductive type.

10. The optical phase modulator according to claim 9, wherein the first conductive type is a p-type and the second conductive type is an n-type.

11. The optical phase modulator according to claim 1, wherein the PN junction is constituted of a single PN junction which is formed of a single p-type region and a single n-type region which extend in the light propagation direction.

12. The optical phase modulator according to claim 1, wherein in the p-type $Si_{1-x}Ge_x$ layer, x is in a range of $0 \leq x < 0.6$.

13. The optical phase modulator according to claim 1, wherein crystal orientation of the substrate is <110>.

14. An optical intensity modulator comprising the optical phase modulator according to claim 1.

15. A method for manufacturing an optical phase modulator, the method comprising:
a step of forming a PN junction or a PIN junction which is formed of Si or $Si_{1-y}Ge_y$ and is formed in a lateral direction, the PN junction or the PIN junction comprising a p-type region and an n-type region;
a step of forming first conductive type-doping and second conductive type-doping regions which respectively neighbor the PN junction or the PIN junction and of forming a first electrode of a first conductive type and a second electrode of a second conductive type; and
a step of, on the PN junction or the PIN junction, forming a p-type $Si_{1-y}Ge_y$ layer which is constituted of at least one layer and is electrically connected to the PN junction or the PIN junction, the p-type $Si_{1-y}Ge_y$ layer being doped with a p-type impurity,
wherein
by the PN junction or PIN junction and the p-type $Si_{1-y}Ge_y$ layer, a rib-type waveguide structure having a substantially uniform structure along a light propagation direction is formed, and
in a direction parallel with a substrate and perpendicular to the light propagation direction, a position of a junction interface of the PN junction or the PIN junction is offset from a center of the p-type $Si_{1-y}Ge_y$ layer so that a contact area where the p-type $Si_{1-y}Ge_y$ layer contacts the n-type region is larger than a contact area where the p-type $Si_{1-y}Ge_y$ layer contacts the p-type region, so as to increase an electrical capacitance of the PN junction or the PIN junction.

* * * * *